United States Patent
Saruwatari

(10) Patent No.: US 11,046,388 B2
(45) Date of Patent: Jun. 29, 2021

(54) DRIVE SYSTEM, AND VEHICLE INCLUDING THE DRIVE SYSTEM

(71) Applicant: YAMAHA HATSUDOKI KABUSHIKI KAISHA, Iwata (JP)

(72) Inventor: Yutaka Saruwatari, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 160 days.

(21) Appl. No.: 16/367,307

(22) Filed: Mar. 28, 2019

(65) Prior Publication Data

US 2019/0300104 A1 Oct. 3, 2019

(30) Foreign Application Priority Data

Mar. 30, 2018 (JP) .............................. JP2018-067254

(51) Int. Cl.
*B62M 6/45* (2010.01)
*B62M 6/55* (2010.01)
*B62M 6/90* (2010.01)

(52) U.S. Cl.
CPC ................ *B62M 6/45* (2013.01); *B62M 6/55* (2013.01); *B62M 6/90* (2013.01)

(58) Field of Classification Search
CPC . B62M 6/45; B62M 6/55; B62M 6/90; B62K 23/04; B60K 35/00
See application file for complete search history.

(56) References Cited

U.S. PATENT DOCUMENTS

| | | |
|---|---|---|
| 2002/0029919 A1 | 3/2002 | Patmont et al. |
| 2004/0040766 A1 | 3/2004 | Ko |
| 2014/0196968 A1 | 7/2014 | Bieler et al. |
| 2015/0352973 A1* | 12/2015 | Gao ........................ B60L 58/12 318/139 |
| 2016/0297499 A1* | 10/2016 | Ohashi ..................... B62M 6/55 |
| 2017/0192427 A1 | 7/2017 | Bivans et al. |
| 2018/0257741 A1* | 9/2018 | Saruwatari ............... B62M 3/08 |
| 2020/0361563 A1* | 11/2020 | Takeshita ................ B62J 99/00 |
| 2020/0377176 A1* | 12/2020 | Shirai ...................... B62J 45/20 |

FOREIGN PATENT DOCUMENTS

| | | | |
|---|---|---|---|
| CN | 103434603 A | * 12/2013 | .............. B62M 6/40 |
| CN | 103507908 A | 1/2014 | |
| EP | 2 361 827 A2 | 8/2011 | |

(Continued)

*Primary Examiner* — Vinh Luong
(74) *Attorney, Agent, or Firm* — Keating and Bennett, LLP

(57) ABSTRACT

A drive system includes an electric motor, first and second electrical contacts, and a microcontroller configured or programmed to control an operation of the electric motor based on first and second signals regarding states of the first and second electrical contacts. After determining that a first state in which the first signal and the second signal both indicate OFF is detected, if it is determined that a second state in which the first signal and the second signal both indicate ON is detected, the microcontroller performs a control that causes the electric motor to generate motive power. If it is determined that the first state is not detected, the microcontroller does not perform a control that causes the electric motor to generate motive power, even if both of the first electrical contact and the second electrical contact take an ON state.

16 Claims, 17 Drawing Sheets

(56) References Cited

FOREIGN PATENT DOCUMENTS

| EP | 3546332 A1 | * | 10/2019 | ............. | B62M 6/45 |
|----|------------|---|---------|---------------|-----------|
| JP | 06-007387 Y2 | | 2/1994 | | |
| JP | 11-171081 A | | 6/1999 | | |
| JP | 2001-169366 A | | 6/2001 | | |
| JP | 2011-183968 A | | 9/2011 | | |
| JP | 2015-016793 A | | 1/2015 | | |

* cited by examiner

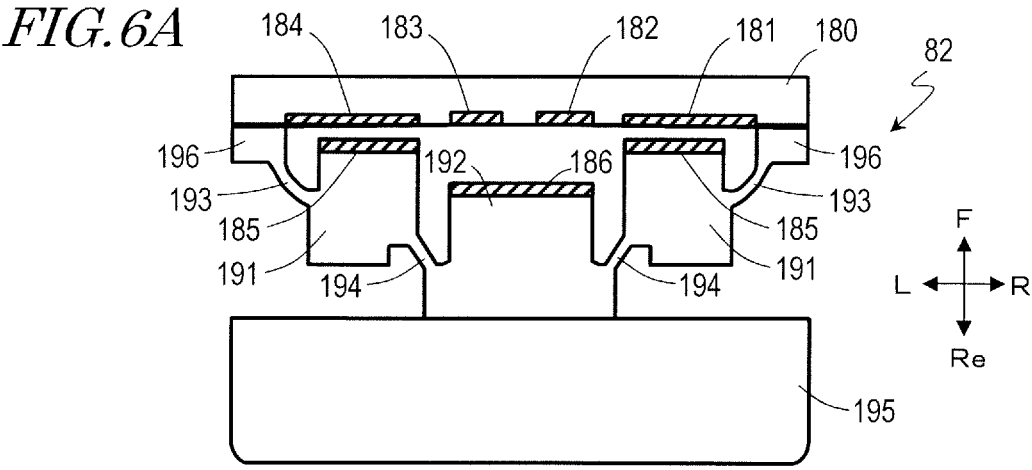
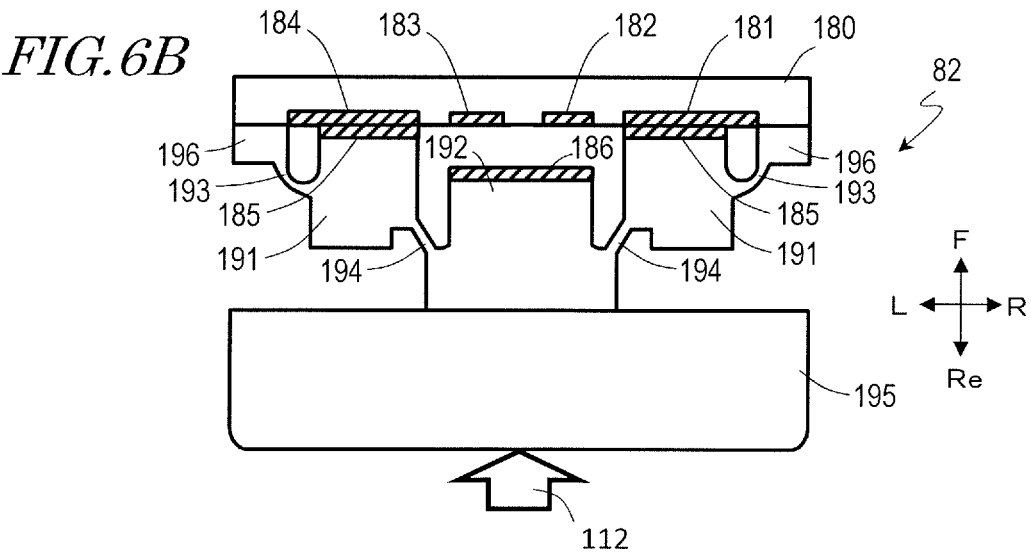
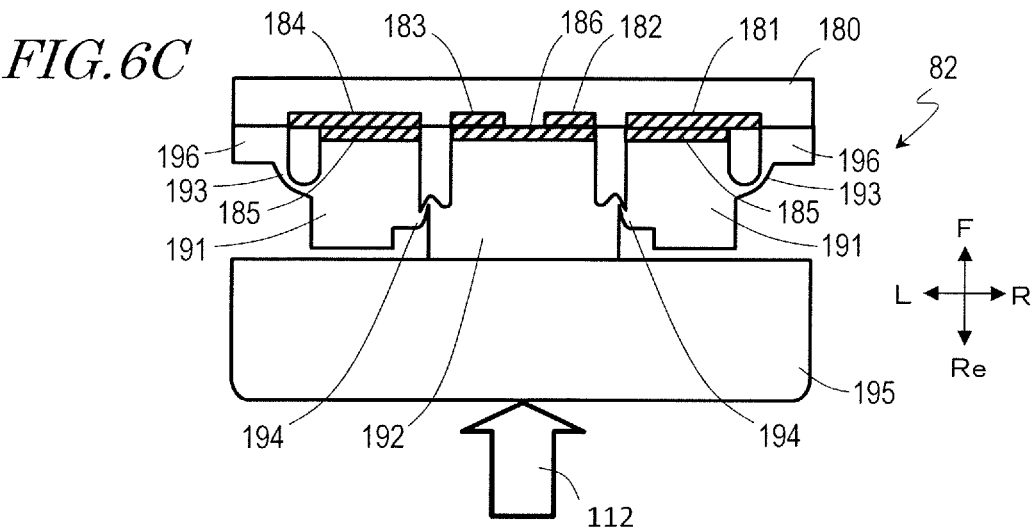

US 11,046,388 B2

DRIVE SYSTEM, AND VEHICLE INCLUDING THE DRIVE SYSTEM

CROSS REFERENCE TO RELATED APPLICATION

This application claims the benefit of priority to Japanese Patent Application No. 2018-067254 filed on Mar. 30, 2018. The entire contents of this application are hereby incorporated herein by reference.

BACKGROUND OF THE INVENTION

1. Field of the Invention

The present invention relates to a drive system, and a vehicle including the drive system.

2. Description of the Related Art

An example of a vehicle which moves in accordance with motive power generated by a motive power source is an electrically assisted bicycle having an electric motor that assists in the force applied by a rider stepping on the pedals (see, for example, Japanese Laid-Open Patent Publication No. 11-171081). In an electrically assisted bicycle, the electric motor generates a driving power which is in accordance with the human force that a rider applies to the pedals, such that the burden of the rider when going up an ascent, or carrying luggage, can be reduced.

Near the grips on the handle of an electrically assisted bicycle, a manipulation device is provided on which a plurality of switches are disposed to receive instructions from the rider. By manipulating the switches on the manipulation device, the rider is able to toggle between power ON and OFF states of the electrically assisted bicycle, or set the magnitude of an assistance force to be generated by the electric motor.

In recent years, in various countries of the world, electrically assisted bicycles are considered as a means of transportation for casual use, and are becoming increasingly popular.

As such, an electrically assisted bicycle is required to have many functions. For example, on the European market, it is desired for electrically assisted bicycles to have a wide variety of functions, e.g., a self-propelling function such as a walk-along function, or a data communication function with a smartphone or a cloud on an IOT (Internet of Things) basis, and so on.

Now, the notion of "walking along" will be described. To "walk along" means for a rider to push forward a bicycle without actually stepping on the pedals of the bicycle. An instance of walk-along may be a motion of a rider who has gotten off the bicycle and is pushing forward the bicycle while walking on foot, in which the handle is being pushed by the hands of the rider.

Some models of electrically assisted bicycles are able to carry out a walk-along mode in which, while the rider walks along with the bicycle, the electric motor is allowed to generate an assistance force. On the manipulation device of such an electrically assisted bicycle, a walk-along switch is provided for receiving an instruction to enter the walk-along mode from the rider.

When the rider keeps pressing the walk-along switch with a finger or a thumb during a walk-along, the electric motor generates an assistance force. The assistance force being generated by the electric motor during a walk-along reduces the burden of the rider. For example, when the rider is pushing forward the electrically assisted bicycle with a hand while walking on foot and going up an ascent, the burden of the rider can be reduced.

Once the rider ceases to keep pressing the walk-along switch, the walk-along mode is ended.

In such a walk-along operation, it is expected that the electric motor does not generate an assistance force in the absence of the rider's operation of the walk-along switch.

SUMMARY OF THE INVENTION

Preferred embodiments of the present invention provide improved reliability of controlling motive power sources, such as electric motors that generate motive power to cause a vehicle to move.

A drive system according to a preferred embodiment of the present invention for use in a vehicle includes a motive power source that generates motive power that causes the vehicle to move, a first electrical contact and a second electrical contact each of which switches between an ON state and an OFF state in response to a rider's operation; and a control circuit that receives a first signal regarding a state of the first electrical contact and a second signal regarding a state of the second electrical contact, and controls an operation of the motive power source in accordance with the first signal and the second signal, wherein the control circuit is configured or programmed to: determine whether a first state, in which the first signal and the second signal both indicate OFF, is detected or not; after determining that the first state is detected, determine whether a second state, in which the first signal and the second signal both indicate ON, is detected or not; when it is determined that the second state is detected after detection of the first state, perform a control that causes the motive power source to generate motive power; and while the first state is not detected, even when both of the first electrical contact and the second electrical contact take an ON state, not perform a control that causes the motive power source to generate motive power.

In a walk-along operation of an electrically assisted bicycle as one example of a vehicle, it is expected that the electric motor is not allowed to generate an assistance force unless the walk-along switch is manipulated by the rider.

In order to prevent the electric motor from generating an assistance force due to malfunctioning or the like, two electrical contacts may be provided to receive an instruction from the rider for the electric motor to generate an assistance force. Only when detecting that both of the two electrical contacts have entered an ON state in response to the rider's operation, the electric motor is allowed to generate an assistance force. When at least one of the two electrical contacts is in an OFF state, the electric motor is not allowed to generate an assistance force. By thus providing two electrical contacts, the reliability of controlling the electric motor as a motive power source is improved.

However, if a fault occurs such that one of the two electrical contacts remains perpetually in an ON state, the rider's operation that manipulates the other electrical contact alone might cause a misdetection that both of the electrical contacts are in an ON state.

A drive system according to a preferred embodiment of the present invention includes a first electrical contact and a second electrical contact. The control circuit determines whether a first state, in which a first signal regarding a state of the first electrical contact and a second signal regarding a state of the second electrical contact both indicate OFF, is detected or not. After determining that the first state is detected, the control circuit then determines whether a second state, in which the first signal and the second signal both indicate ON, is detected or not. When it is determined that the second state is detected after detection of the first state, then a control that causes the motive power source to generate motive power is performed. While the first state is not detected, even if both of the first electrical contact and the second electrical contact take an ON state, the control circuit does not perform a control that causes the motive power source to generate motive power.

If a fault occurs such that at least one of the first electrical contact and the second electrical contact remains perpetually in an ON state, the first state will not be detected, and therefore a control that causes the motive power source to generate motive power is not performed. The motive power source is allowed to generate motive power only when, after confirming the existence of a state in which both of the first electrical contact and the second electrical contact become OFF, both of these contacts becoming ON is detected. This improves the reliability of controlling the motive power source.

In a preferred embodiment of the present invention, the control circuit may be configured or programmed to: after it is determined that the first state is detected, determine whether a third state, in which one of the first signal and the second signal indicates ON but the other indicates OFF, lasts for a first predetermined period of time; when it is determined that the third state has lasted for the first predetermined period of time, again determine whether the first state is detected or not; after determining again that the first state is detected, again determine whether the third state lasts for the first predetermined period of time or not; determine whether the third state lasting for the first predetermined period of time has occurred a first predetermined number of times or more; and, when it is determined that the third state lasting for the first predetermined period of time has occurred the first predetermined number of times or more, not perform a control that causes the motive power source to generate motive power.

So long as the first and second electrical contacts are both normal, there may be some difference between the points in time at which the first electrical contact and the second electrical contact may take an ON state, but both will take an ON state within a predetermined period of time from the rider's operation.

On the other hand, in the presence of a fault such that one of the first and second electrical contacts can never take an ON state, one of the first and second electrical contacts will remain in an OFF state, despite the rider's operation. In this case, the second state will not be detected, and therefore the motive power source will not generate motive power. Recognizing that motive power is not generated, the rider may try to manipulate the first and second electrical contacts again. As the operation is tried again, the first state will be again detected. If the above-described fault exists, after the redetection of the first state, the third state lasting for the predetermined period of time will be detected again.

If the third state lasting for the first predetermined period of time has occurred a first predetermined number of times or more, a control that causes the motive power source to generate motive power is not performed. This improves the reliability of controlling the motive power source.

In a preferred embodiment of the present invention, the control circuit may be configured or programmed to: when it is determined that the second state is detected before the first predetermined period of time elapses since detection of the third state, perform a control that causes the motive power source to generate motive power.

Even if the rider has manipulated the first and second electrical contacts, depending on how the rider's operation is actually performed, one of the first and second electrical contacts may take a long time before going into an ON state. If one of the first and second electrical contacts takes an ON state within a predetermined period of time since the other takes an ON state, a control that causes the motive power source to generate motive power is performed, thus providing an improved ease of using the vehicle.

In a preferred embodiment of the present invention, the control circuit may be configured or programmed to: when it is determined that the second state is detected before the third state lasting for the first predetermined period of time occurs the first predetermined number of times, perform a control that causes the motive power source to generate motive power.

Even if the rider has manipulated the first and second electrical contacts, depending on how the rider's operation is actually performed, one of the first and second electrical contacts may take a long time before going into an ON state. If the third state is not repeated the first predetermined number of times or more, a control that causes the motive power source to generate motive power is performed, thus providing an improved ease of using the vehicle.

In a preferred embodiment of the present invention, the control circuit may be configured or programmed to: after determining that the first state and the second state are detected, determine whether a fourth state, in which at least one of the first signal and the second signal indicates OFF, is detected or not; when it is determined that the fourth state is detected, stop the control that causes the motive power source to generate motive power; after determining that the fourth state is detected, determine whether the second state is again detected within a second predetermined period of time; and, when it is determined that the second state is again detected, resume the control that causes the motive power source to generate motive power.

Even if the rider intends to continue manipulating the first and second electrical contacts, depending on how the rider's operation is actually performed, vibration of the vehicle, etc., at least one of the first and second electrical contacts may temporarily come into an OFF state. Even without again determining whether the first state is detected or not, the control that causes the motive power source to generate motive power may be resumed, thus providing an improved ease of using the vehicle.

In a preferred embodiment of the present invention, the control circuit may be configured or programmed to: after determining that the fourth state is detected, when it is determined that the second state is not detected again within the second predetermined period of time, again determine whether the first state is detected or not.

When the rider's operation is improper, or a fault occurs such that at least one of the first and second electrical contacts can never take an ON state, the second state will not be detected again within the second predetermined period of time. In such a case, the control returns to the process of determining whether the first state is detected or not. If the rider's operation was improper, the rider may now retry a proper operation, thus allowing the motive power source to generate motive power. In the presence of a fault such that at least one of the first and second electrical contacts can never take an ON state, the motive power source is not allowed to generate motive power. This improves the reliability of controlling the motive power source.

In a preferred embodiment of the present invention, the control circuit may be configured or programmed to: after determining that the first state is detected, determine a fifth state, in which the second signal indicates ON within a third predetermined period of time since the first signal indicates ON, is detected or not; and, when it is determined that the fifth state is detected, not perform a control that causes the motive power source to generate motive power.

In an implementation in which a difference between points in time at which the first electrical contact and the second electrical contact become ON exists during normal operation, if the first electrical contact and the second electrical contact are short-circuited to each other, the first signal and the second signal may simultaneously indicate ON in response to the rider's operation.

If the second signal indicates ON within the third predetermined period of time since the first signal indicates ON, it is possible that the first electrical contact and the second electrical contact may be short-circuited to each other, and therefore the motive power source is not allowed to generate motive power. This improves the reliability of controlling the motive power source.

In a preferred embodiment of the present invention, the control circuit may be configured or programmed to: after determining that the first state is detected, determine a fifth state, in which the second signal indicates ON within a third predetermined period of time since the first signal indicates ON, is detected or not; and, when it is determined that the fifth state is detected, again determine whether the first state is detected or not.

In an implementation in which a difference between points in time at which the first electrical contact and the second electrical contact become ON exists during normal operation, if the first electrical contact and the second electrical contact are short-circuited to each other, the first signal and the second signal may simultaneously indicate ON in response to the rider's operation.

If the second signal indicates ON within the third predetermined period of time since the first signal indicates ON, it is possible that the first electrical contact and the second electrical contact may be short-circuited to each other, and therefore the motive power source is not allowed to generate motive power. Recognizing that motive power is not generated, the rider may try to manipulate the first and second electrical contacts again. As the operation is tried again, the first state will be again detected. If the above-described short-circuiting exists, after the redetection of the first state, the fifth state will be again detected; therefore, a control that causes the motive power source to generate motive power is not performed. This improves the reliability of controlling the motive power source.

In a preferred embodiment of the present invention, the control circuit may be configured or programmed to: when it is determined that the fifth state is not detected, and yet the second state is detected, perform a control that causes the motive power source to generate motive power.

If the first electrical contact and the second electrical contact are not short-circuited to each other, the normal control of allowing the motive power source to generate motive power is performed.

In a preferred embodiment of the present invention, the control circuit may be configured or programmed to: determine whether a sixth state, in which the first state is continuously undetected, lasts for a fourth predetermined period of time; and, when it is determined that the sixth state has lasted for the fourth predetermined period of time, determine that at least one of the first electrical contact and the second electrical contact is faulty.

If a fault occurs such that at least one of the first and second electrical contacts remains perpetually in an ON state, the first state will not be detected. If the sixth state, in which the first state is continuously undetected, lasts for the fourth predetermined period of time, it is determined that a fault exists. This improves the reliability of controlling the motive power source.

In a preferred embodiment of the present invention, the motive power source may be an electric motor. This improves the reliability of controlling the electric motor that generates motive power that causes the vehicle to move.

In a preferred embodiment of the present invention, the drive system may further include a double-pole double-throw switch that includes the first electrical contact and the second electrical contact. The rider is able to manipulate the first electrical contact and the second electrical contact by pressing the double-pole double-throw switch.

In a preferred embodiment of the present invention, the drive system may further include a first switch that includes the first electrical contact and a second switch that includes the second electrical contact. The rider is able to manipulate the first electrical contact and the second electrical contact by pressing the first switch and the second switch.

An electrically assisted bicycle according to a preferred embodiment of the present invention includes a drive system according to a preferred embodiment of the present invention described above. As a result, an electrically assisted bicycle is provided with an improved reliability of controlling the motive power source.

In a preferred embodiment of the present invention, the control circuit may be configured or programmed to: when it is determined that the second state is detected after detection of the first state, perform a control that causes the electrically assisted bicycle to enter a walk-along mode that allows the motive power source to generate an assistance force while the rider walks along with the electrically assisted bicycle. As a result, an electrically assisted bicycle is provided with an improved reliability of controlling the walk-along mode.

A drive system according to a preferred embodiment of the present invention includes a first electrical contact and a second electrical contact each of which switches between an ON state and an OFF state in response to the rider's operation. The control circuit determines whether a first state, in which a first signal regarding a state of the first electrical contact and a second signal regarding a state of the second electrical contact both indicate OFF, is detected or not. After determining that the first state is detected, the control circuit then determines whether a second state, in which the first signal and the second signal both indicate ON, is detected or not. If it is determined that the second state is detected after detection of the first state, then a control that causes the motive power source to generate motive power is performed. In the case in which the first state is not detected, the control circuit does not perform a control that causes the motive power source to generate motive power, even if the first electrical contact and the second electrical contact take an ON state.

If a fault occurs such that at least one of the first electrical contact and the second electrical contact remains perpetually in an ON state, the first state will not be detected, and therefore a control that causes the motive power source to generate motive power is not performed. The motive power source is allowed to generate motive power only when, after confirming the existence of a state in which both of the first electrical contact and the second electrical contact become OFF, both of these contacts becoming ON is detected. This improves the reliability of controlling the motive power source.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 6A is a cross-sectional view along line A-A in FIG. 6 showing an exemplary structure of a walk-along switch according to a preferred embodiment of the present invention.

FIG. 6B is a cross-sectional view along line A-A in FIG. 6 showing an exemplary structure of a walk-along switch according to a preferred embodiment of the present invention.

FIG. 6C is a cross-sectional view along line A-A in FIG. 6 showing an exemplary structure of a walk-along switch according to a preferred embodiment of the present invention.

DETAILED DESCRIPTION OF THE PREFERRED EMBODIMENTS

Figure 1:
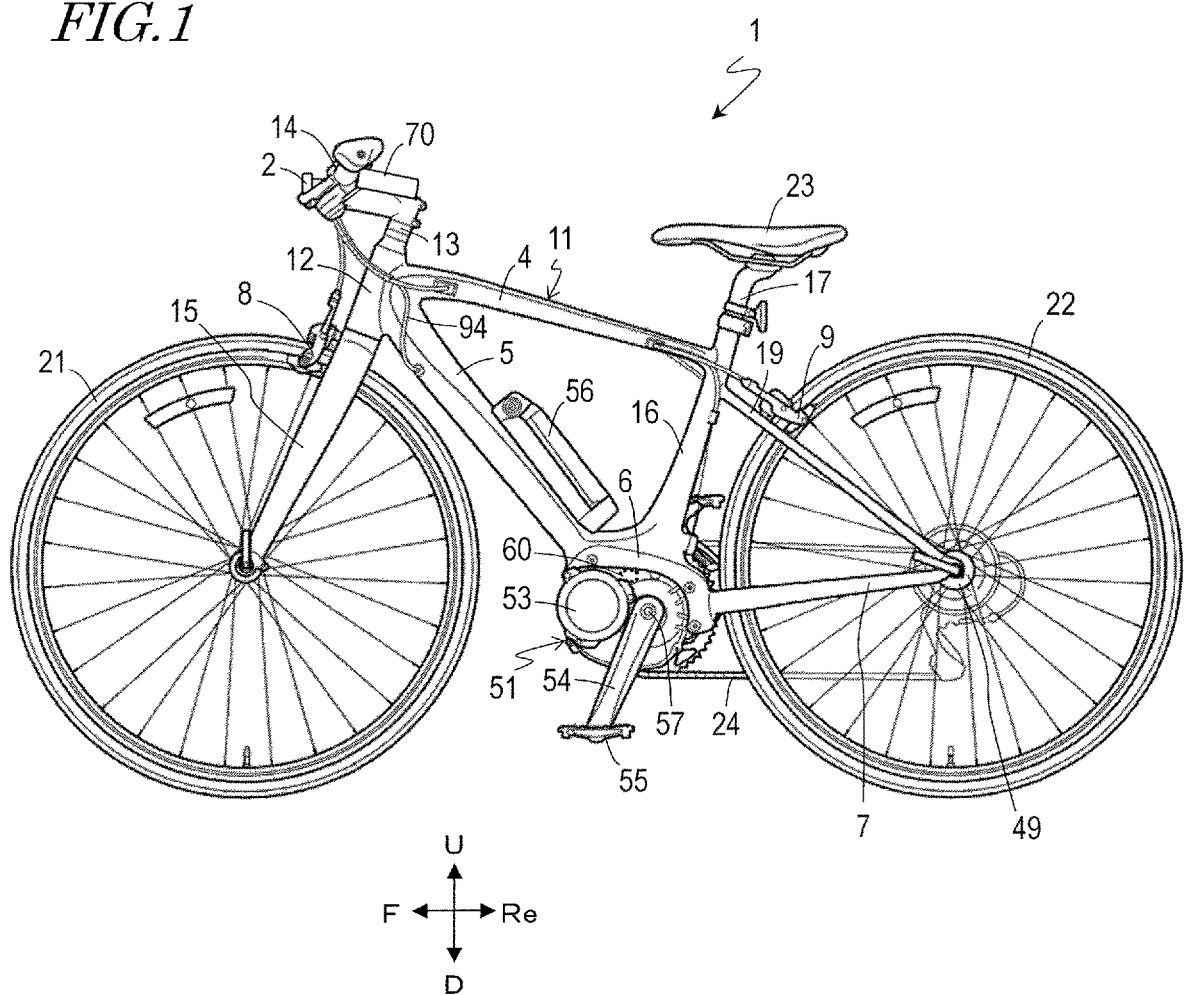
FIG. 1 is a side view showing an electrically assisted bicycle according to a preferred embodiment of the present invention.

Hereinafter, with reference to the drawings, drive systems, and vehicles including the drive systems according to preferred embodiments of the present invention will be described. In the following description, an electrically assisted bicycle will be illustrated as an example of a vehicle. In the description of the preferred embodiment, like component elements are denoted by like reference numerals, and description of any overlapping component elements will be omitted. In the preferred embodiments of the present invention, any reference to "front/rear", "right/left" and "above(up)/below (down)" is based on a state in which a rider is seated on a saddle (seat) of an electrically assisted bicycle so as to face the handle. In the drawings, reference numerals F, Re, L, R, U and D respectively represent front, rear, left, right, up, and down. Note that the following preferred embodiments are illustrative, and the present invention is not limited to the following preferred embodiments.

FIG. 1 is a side view showing an electrically assisted bicycle 1 according to a preferred embodiment of the present invention.

The electrically assisted bicycle 1 includes a body frame 11. The body frame 11 includes a head pipe 12, a top tube 4, a down tube 5, a bracket 6, a chain stay 7, a seat tube 16, and a seat stay 19. The head pipe 12 is disposed at the front end of the body frame 11. The handle stem 13 is inserted in the head pipe 12 so as to be capable of rotation. A handle 14 is fixed at an upper portion of the handle stem 13. Front forks 15 are fixed at a lower portion of the handle stem 13. Lower end portions of the front forks 15 support a front wheel 21, defining a steering wheel, so as to be capable of rotation. A brake 8 to act on the front wheel 21 is provided on the front forks 15. On the handle 14, a display device 70 is provided to display various information concerning the electrically assisted bicycle 1. A headlamp 2 is provided forward of the handle stem 13.

The down tube 5 extends obliquely below and rearward from the head pipe 12. The seat tube 16 extends upward from a rear end portion of the down tube 5. The chain stay 7 extends rearward from a lower end portion of the seat tube 16. The bracket 6 connects together the rear end portion of the down tube 5, the lower end portion of the seat tube 16, and a front end portion of the chain stay 7. The top tube 4 is provided so as to connect the head pipe 12 with an upper portion of the seat tube 16.

A seat post 17 is inserted in the seat tube 16, and a saddle 23 for a rider to sit on is provided at an upper end portion of the seat post 17. A rear end portion of the chain stay 7 supports a rear wheel 22, which defines a drive wheel, so as to be capable of rotation. The seat stay 19 extends obliquely below and rearward from an upper portion of the seat tube 16. A lower end portion of the seat stay 19 is connected to the rear portion of the chain stay 7. A brake 9 to act on the rear wheel 22 is provided on the seat stay 19. A speed sensor 49 to detect rotation of the rear wheel 22 is provided at the rear end portion of the chain stay 7.

A drive unit 51 is provided on the bracket 6, which in itself is placed near the vehicle central portion of the body frame 11. The drive unit 51 includes an electric motor 53, a crank shaft 57, and a controller 60. A battery 56 to supply electric power to the electric motor 53 and the like is mounted on the down tube 5. The battery 56 may be mounted to the bracket 6 or the seat tube 16. The battery 56 is detachable from the electrically assisted bicycle 1. Charging of the battery 56 is performed by connecting the battery 56 to an external charger (not shown), with the battery 56 being removed from the electrically assisted bicycle 1, for example.

The crank shaft 57 is supported by the drive unit 51 by penetrating therethrough in the right-left direction. Crank arms 54 are provided at both ends of the crank shaft 57. At the leading end of each crank arm 54, a pedal 55 is provided so as to be capable of rotation.

The controller 60 controls the operation of the electrically assisted bicycle 1. Typically, the controller 60 includes a semiconductor integrated circuit such as a microcontroller, a signal processor, etc., that is capable of digital signal processing. A rotational output of the crank shaft 57 which is generated as the rider steps on the pedals 55 with his or her feet is transmitted to the rear wheel 22 via a chain 24. The controller 60 controls the electric motor 53 so as to generate a drive assisting output based on the rotational output of the crank shaft 57. The assistance force which is generated by the electric motor 53 is transmitted to the rear wheel 22 via the chain 24. Instead of the chain 24, a belt, a shaft, or the like may be used. With the electrically assisted bicycle 1, the burden of the rider can be reduced because the electric motor 53 generates an assistance force that assists the human force of the rider.

Figure 2:
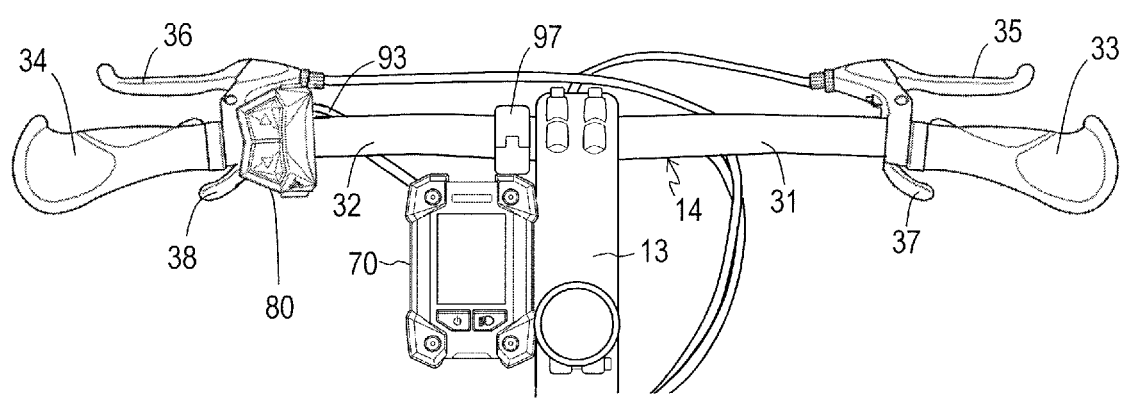
FIG. 2 is an upper plan view showing a front portion of an electrically assisted bicycle according to a preferred embodiment of the present invention.
Figure 2:
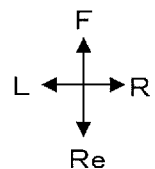

FIG. 2 is an upper plan view showing a front portion of the electrically assisted bicycle 1. The handle 14 includes a right handle bar 31 and a left handle bar 32. A right grip 33 is provided at the right end of the right handle bar 31. A left grip 34 is provided at the left end of the left handle bar 32. The rider steers while gripping the right grip 33a and the left grip 34 with the hands.

A front-wheel brake lever 35 and a gear shifter 37 are provided near the right grip 33. A rear-wheel brake lever 36 and a gear shifter 38 are provided near the left grip 34. As the front-wheel brake lever 35 is gripped by the right hand together with the right grip 33, braking power is applied to the front wheel 21. As the rear-wheel brake lever 36 is gripped by the left hand together with the left grip 34, braking power is applied to the rear wheel 22. The gear shifters 37 and 38 are also called shifters. By manipulating the gear shifters 37 and 38, the rider is able to switch the gear ratio.

On the handle 14, the display device 70 is provided to display various information concerning the electrically assisted bicycle 1. In this example, the display device 70 is attached to the left handle bar 32 by using a clamp 97. A manipulation device 80 is provided near the left grip 34 on the left handle bar 32. By manipulating the manipulation device 80 with a finger or a thumb, the rider is able to perform various operations, such as setting the magnitude of an assistance force of the electric motor 53. A signal based on the rider's operation is sent from the manipulation device 80 to the display device 70 via wiring lines 93. The display device 70 and the controller 60 of the drive unit 51 (FIG. 1) are able to exchange signals via the wiring lines 94 (FIG. 1).

Figure 3:
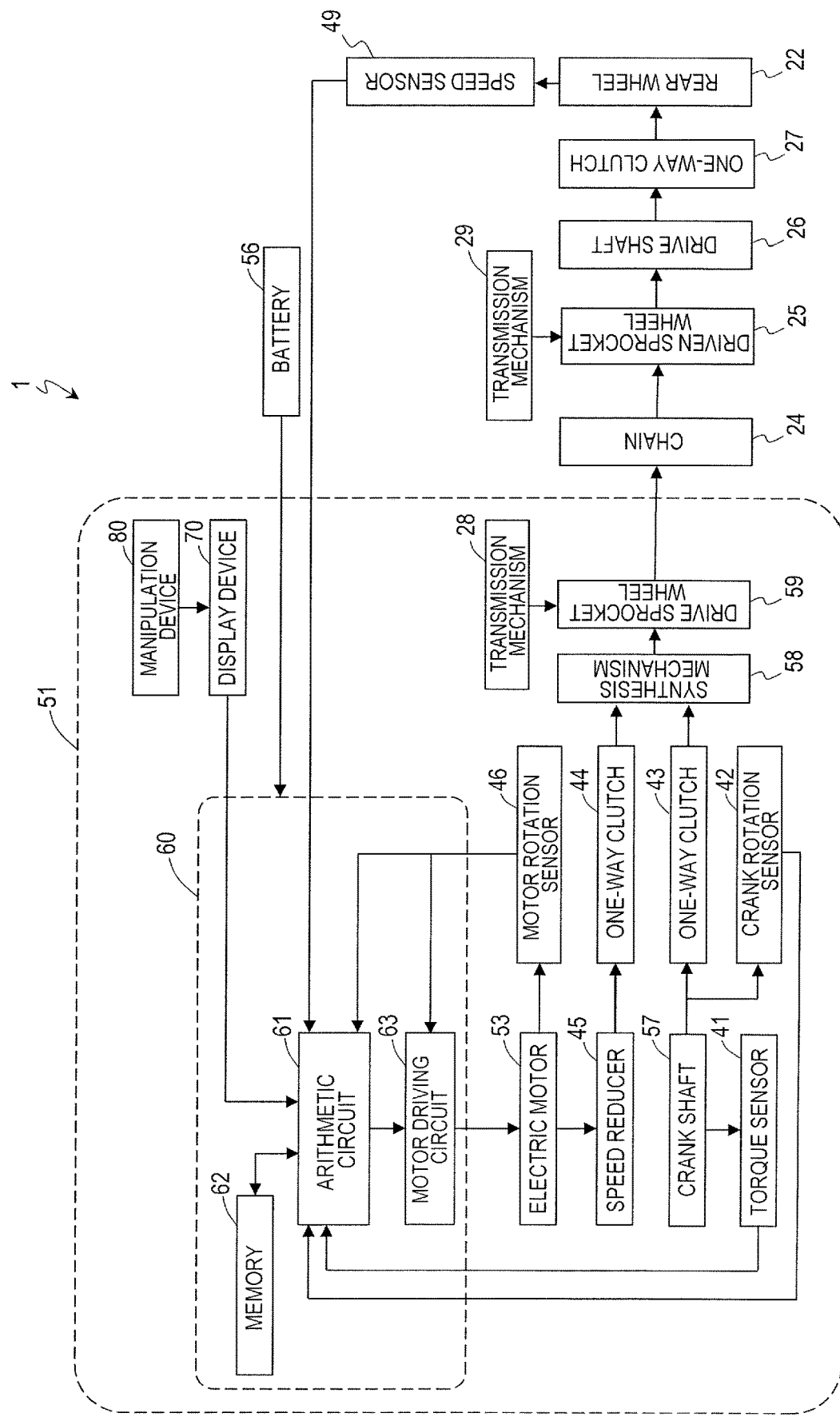
FIG. 3 is a block diagram showing a mechanical and electrical construction of an electrically assisted bicycle according to a preferred embodiment of the present invention.

FIG. 3 is a block diagram showing a mechanical and electrical construction of the electrically assisted bicycle 1. The drive unit 51 includes the controller 60, the electric motor 53, a motor rotation sensor 46, a speed reducer 45, a one-way clutch 44, the crank shaft 57, a one-way clutch 43, a torque sensor 41, a crank rotation sensor 42, a synthesis mechanism 58, a drive sprocket wheel 59, and a transmission mechanism 28. The drive unit 51 causes the electric motor 53 to generate a drive assisting output in accordance with the human force of a rider as applied to the pedals 55 (FIG. 1). In the present preferred embodiment, it is assumed that the display device 70 and the manipulation device 80 are included within the drive unit 51 as a drive system.

First, the transmission path of motive power will be described. As the rider steps on the pedals 55 (FIG. 1) to rotate the crank shaft 57, this rotation of the crank shaft 57 is transmitted to the synthesis mechanism 58 via the one-way clutch 43. Via the speed reducer 45 and the one-way clutch 44, rotation of the electric motor 53 is transmitted to the synthesis mechanism 58.

The synthesis mechanism 58 may include, e.g., a cylindrical member, such that the crank shaft 57 is disposed inside the cylindrical member. The synthesis mechanism 58 includes a drive sprocket wheel 59 mounted thereto. The synthesis mechanism 58 rotates around the same axis of rotation as the crank shaft 57 and the drive sprocket wheel 59.

The one-way clutch 43 transmits any forward rotation of the crank shaft 57 to the synthesis mechanism 58, while not transmitting any backward rotation of the crank shaft 57 to the synthesis mechanism 58. The one-way clutch 44 transmits to the synthesis mechanism 58 any rotation that is generated by the electric motor 53 in a direction to cause forward rotation of the synthesis mechanism 58, while not transmitting to the synthesis mechanism 58 any rotation occurring in a direction to cause backward rotation of the synthesis mechanism 58. Moreover, while the electric motor 53 is stopped, if the rider moves the pedals 55 so that the synthesis mechanism 58 rotates, the one-way clutch 44 does not transmit this rotation to the electric motor 53. The pedaling force which the rider has applied to the pedals 55 and the assistance force which has been generated by the electric motor 53 are transmitted to the synthesis mechanism 58, in which they are merged. The resultant force as synthesized by the synthesis mechanism 58 is transmitted to the chain 24 via the drive sprocket wheel 59.

Rotation of the chain 24 is transmitted to a drive shaft 26 via a driven sprocket wheel 25. Rotation of the drive shaft 26 is transmitted to the rear wheel 22 via the one-way clutch 27.

In this example, the drive sprocket wheel 59 includes a plurality of sprocket wheels. The transmission mechanism 28 includes a mechanism that alters the gear ratio in response to the rider's operation of the gear shifter 38 (FIG. 2). On the other hand, a transmission mechanism 29 includes a mechanism that alters the gear ratio in response to the rider's operation of the gear shifter 37 (FIG. 2). For example, the transmission mechanism 29 may be an external transmission in which case the driven sprocket wheel 25 includes a plurality of sprocket wheels. Note that the transmission mechanism 29 of the electrically assisted bicycle 1 may be an internal transmission, and is not limited to an external transmission. Only when the rotational speed of the drive shaft 26 is faster than the rotational speed of the rear wheel 22, the one-way clutch 27 transmits rotation of the drive shaft 26 to the rear wheel 22. When the rotational speed of the drive shaft 26 is slower than the rotational speed of the rear wheel 22, the one-way clutch 27 does not transmit rotation of the drive shaft 26 to the rear wheel 22.

Via the above-described transmission path of motive power, the pedaling force which has been applied by the rider to the pedals 55 and the assistance force which has been generated by the electric motor 53 are transmitted to the rear wheel 22.

Note that the mechanism by which the pedaling force of the rider and the assistance force generated by the electric motor 53 are merged is not limited to the synthesis mechanism 58, which rotates around the same axis of rotation as the crank shaft 57. The pedaling force and the assistance force may be merged at the chain 24.

Next, the manner in which driving of the electric motor 53 is controlled by the controller 60 will be described. The controller 60 may include, e.g., an MCU (Motor Control Unit). The controller 60 includes an arithmetic circuit 61, a memory 62, and a motor driving circuit 63. The arithmetic circuit 61 controls the operation of the electric motor 53, and also controls the operation of each section of the electrically assisted bicycle 1. The memory 62 stores a computer program that defines a procedure of controlling the operations of the electric motor 53 and the respective sections of the electrically assisted bicycle 1. The arithmetic circuit 61 reads the computer program from the memory 62 to perform various controls.

The torque sensor 41 detects a human force (pedaling force) that the rider has applied to the pedals 55 as a torque occurring in the crank shaft 57. The torque sensor 41 may be a torque sensor of the magnetostrictive type, for example. The torque sensor 41 outputs a voltage signal of an amplitude that is in accordance with the magnitude of the detected torque. The torque sensor 41 may include a torque calculation circuit (not shown) which converts the voltage signal into a torque value. For example, the torque calculation circuit may convert an analog voltage signal that has been output into a digital value through AD conversion. The magnitude of the detected torque is output to the exterior as a digital signal. The torque sensor 41 may output an analog signal, or output a digital signal. The arithmetic circuit 61 calculates a torque from the output signal of the torque sensor 41.

The crank rotation sensor 42 detects an angle of rotation of the crank shaft 57. To the arithmetic circuit 61, the crank rotation sensor 42 outputs a signal based on the angle of rotation of the crank shaft 57. For example, the crank rotation sensor 42 may detect rotation of the crank shaft 57 at each predetermined angle, and output a rectangular wave signal or a sine wave signal. From the output signal of the crank rotation sensor 42, the arithmetic circuit 61 calculates a rotational speed of the crank shaft 57. The arithmetic circuit 61 multiplies the torque and rotational speed of the crank shaft 57, thus calculating a crank rotational output.

The electric motor 53 includes the motor rotation sensor 46 mounted thereon. The motor rotation sensor 46 may be an encoder, for example. The motor rotation sensor 46 detects an angle of rotation of the rotor of the electric motor 53, and outputs a signal based on the angle of rotation to the arithmetic circuit 61 and the motor driving circuit 63. For example, the motor rotation sensor 46 may detect rotation of the rotor at each predetermined angle, and output a rectangular wave signal or a sine wave signal. From the output signal of the motor rotation sensor 46, the arithmetic circuit 61 and the motor driving circuit 63 calculate a rotational speed of the electric motor 53.

The speed sensor 49 detects an angle of rotation of the rear wheel 22, and outputs a signal based on the angle of rotation to the arithmetic circuit 61. For example, the speed sensor 49 may detect rotation of the rear wheel 22 at each predetermined angle, and output a rectangular wave signal or a sine wave signal. From the output signal of the speed sensor 49, the arithmetic circuit 61 calculates a rotational speed of the rear wheel 22.

The arithmetic circuit 61 computes a gear ratio from the rotational speed of the electric motor 53 and the rotational speed of the rear wheel 22, for example. In the case in which the electrically assisted bicycle 1 includes gearshift sensors which detect gearshift states of the transmission mechanisms 28 and 29, a gear ratio may be computed from output signals of the gearshift sensors.

From the torque and rotational speed of the crank shaft 57, velocity of travel of the vehicle, gear ratio, the rider's operations of the manipulation device 80, information that is stored in the memory 62, etc., the arithmetic circuit 61 calculates a command value used to generate a proper drive assisting output, and transmits it to the motor driving circuit 63. The arithmetic circuit 61 may calculate the command value by, for example, referring to a map which has been created based on, e.g., a relationship between the crank rotational output that is generated by the rider's human force applied to the pedals 55 and the drive assisting output that is generated by the electric motor 53. A plurality of types of maps are stored in the memory 62. The arithmetic circuit 61 may read from the memory 62 a map that is suited for the circumstances, and calculate the command value by referring to the map that has been read. The motor driving circuit 63 may be, e.g., an inverter that supplies electric power, based on the command value from the arithmetic circuit 61, from the battery 56 to the electric motor 53. With the supplied electric power, the electric motor 53 rotates and generates a predetermined drive assisting output. Thus, the arithmetic circuit 61 causes the electric motor 53 to generate a drive assisting output to assist with the rider's pedaling motion on the pedals 55 during travelling of the electrically assisted bicycle 1.

Next, the display device 70 and the manipulation device 80 will be described in detail.

Figure 4:
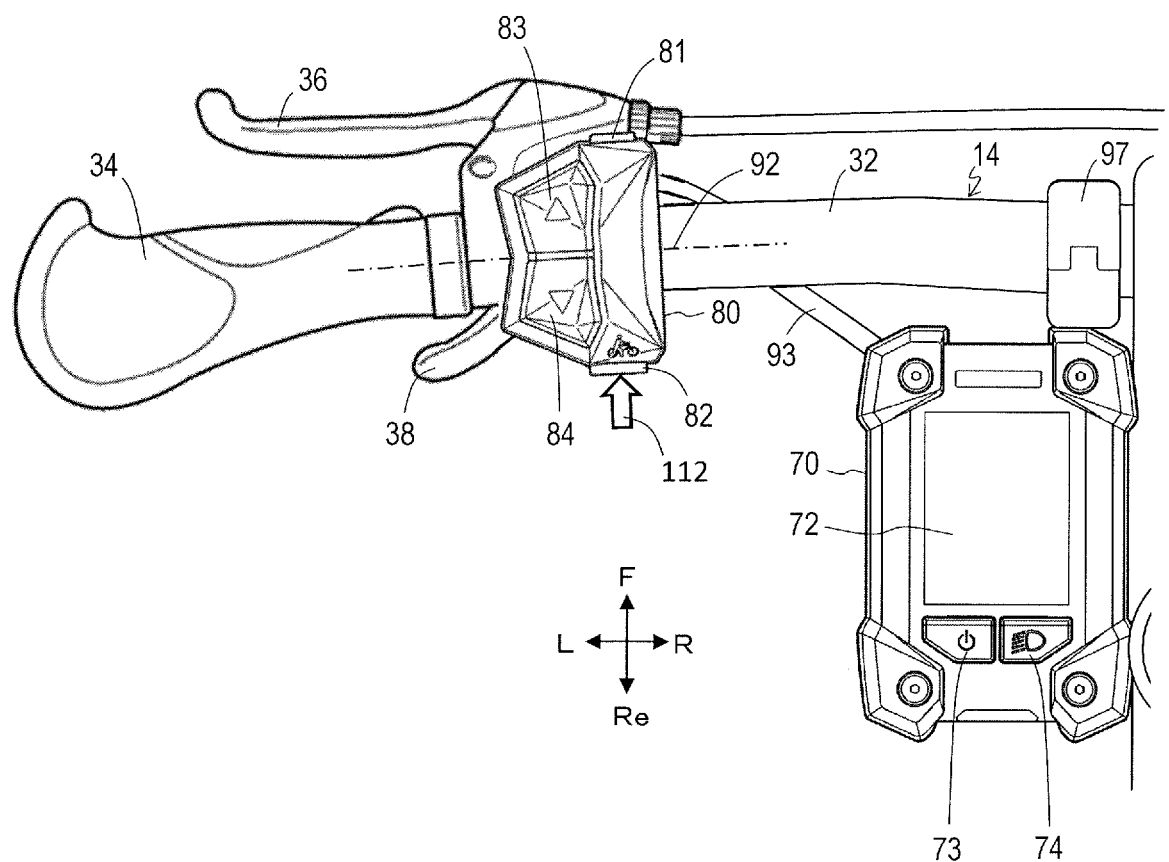
FIG. 4 is an upper plan view showing a display device and a manipulation device according to a preferred embodiment of the present invention.
Figure 15:
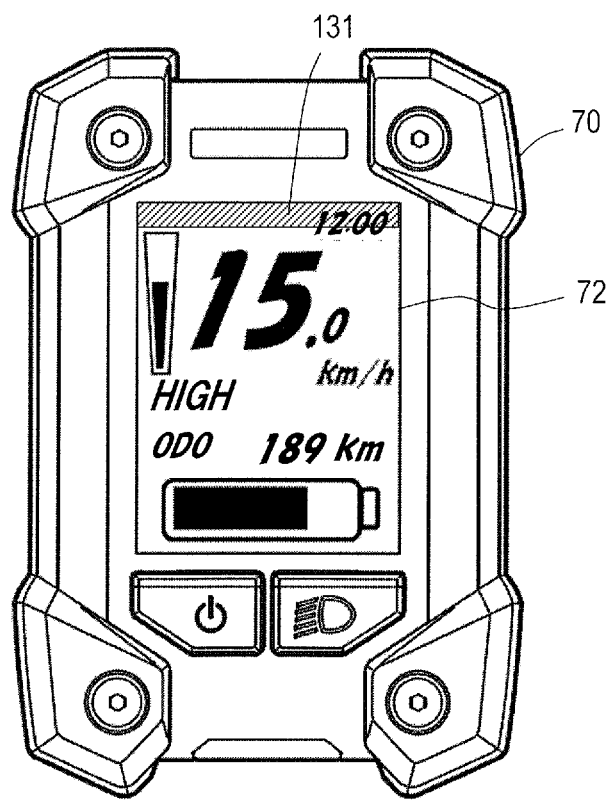
FIG. 15 is a diagram showing an operation of reporting the existence of a fault in the walk-along switch according to a preferred embodiment of the present invention.

FIG. 4 is an upper plan view of the display device 70 and the manipulation device 80. The display device 70 includes a display panel 72, a power switch 73, and a lamp activation switch 74. The display panel 72, which may be, e.g., a liquid crystal panel, displays various information in accordance with the rider's operation of the manipulation device 80. For example, based on the rider's operation, the display panel 72 may sequentially toggle between display modes, e.g., a normal mode and a setup mode. FIG. 15 shows an example of information to be displayed by the display panel 72. During the normal mode as illustrated in FIG. 15, the current time, the velocity of travel, the current assist mode, an odometer, the remaining battery power, etc., are displayed on the display panel 72. During the setup mode, various items that are able to be set are displayed on the display panel 72. Without being limited to a liquid crystal panel, the display panel 72 may be an electro luminescence (EL) panel or an electronic paper panel, for example.

The power switch 73 turns ON or OFF the electrically assisted bicycle 1. The drive unit 51 operates while the electrically assisted bicycle 1 is in a powered ON state; while the electrically assisted bicycle 1 is in a powered OFF state the drive unit 51 does not operate.

The manipulation device 80 is attached to the left handle bar 32 by using, for example, a clamp (not shown). The manipulation device 80 includes a function switch 81, a walk-along switch 82, and assistance force setting switches 83 and 84. In this example, the switches 81, 82, 83 and 84 are, for example, push button switches that are pressed by the rider with a finger or a thumb to operate.

The function switch 81 receives from the rider an operation to change the functions to be respectively assigned to the walk-along switch 82 and the assistance force setting switches 83 and 84.

The walk-along switch (pushing assist switch) 82 receives from the rider an instruction to enter the walk-along mode to cause the electric motor 53 to generate an assistance force while the rider walks along with the electrically assisted bicycle 1. As described earlier, to "walk along" means for a rider to push forward the electrically assisted bicycle 1 without actually stepping on the pedals 55. In the present preferred embodiment, a person who has gotten off the electrically assisted bicycle 1 and is engaged in a walk along motion of pushing the handle 14 with a hand(s), while walking on foot, is also referred to as the "rider".

In this example, the walk-along switch 82 is disposed rearward of the axial center 92 of the left handle bar 32. Disposing the walk-along switch 82 rearward of the axial center 92 makes it easier for the walk-along switch 82 to be manipulated by the rider's thumb.

The assistance force setting switches 83 and 84 are switches with which to set an assistance force of the electric motor 53. The assistance force setting switches 83 and 84 are used to set an assistance force of the electric motor 53, or an assist mode that corresponds to the magnitude of assistance force. The "assistance force" of the electric motor 53 is a force that will assist the human force. In this example, the electrically assisted bicycle 1 includes a plurality of assist modes. The plurality of assist modes may be, for example, a no-assist mode, an eco mode, a normal mode, and a strong mode, this being an ascending order of intensity of the assistance force with respect to the human force. In the no-assist mode, the electric motor 53 does not generate any assistance force.

Although four assist modes are illustrated in the above example, there may be three or fewer assist modes, or five or more assist modes. For example, there may be a mode that generates an assistance force that is greater than that in the strong mode; or there may be more than one eco mode.

Figure 5:
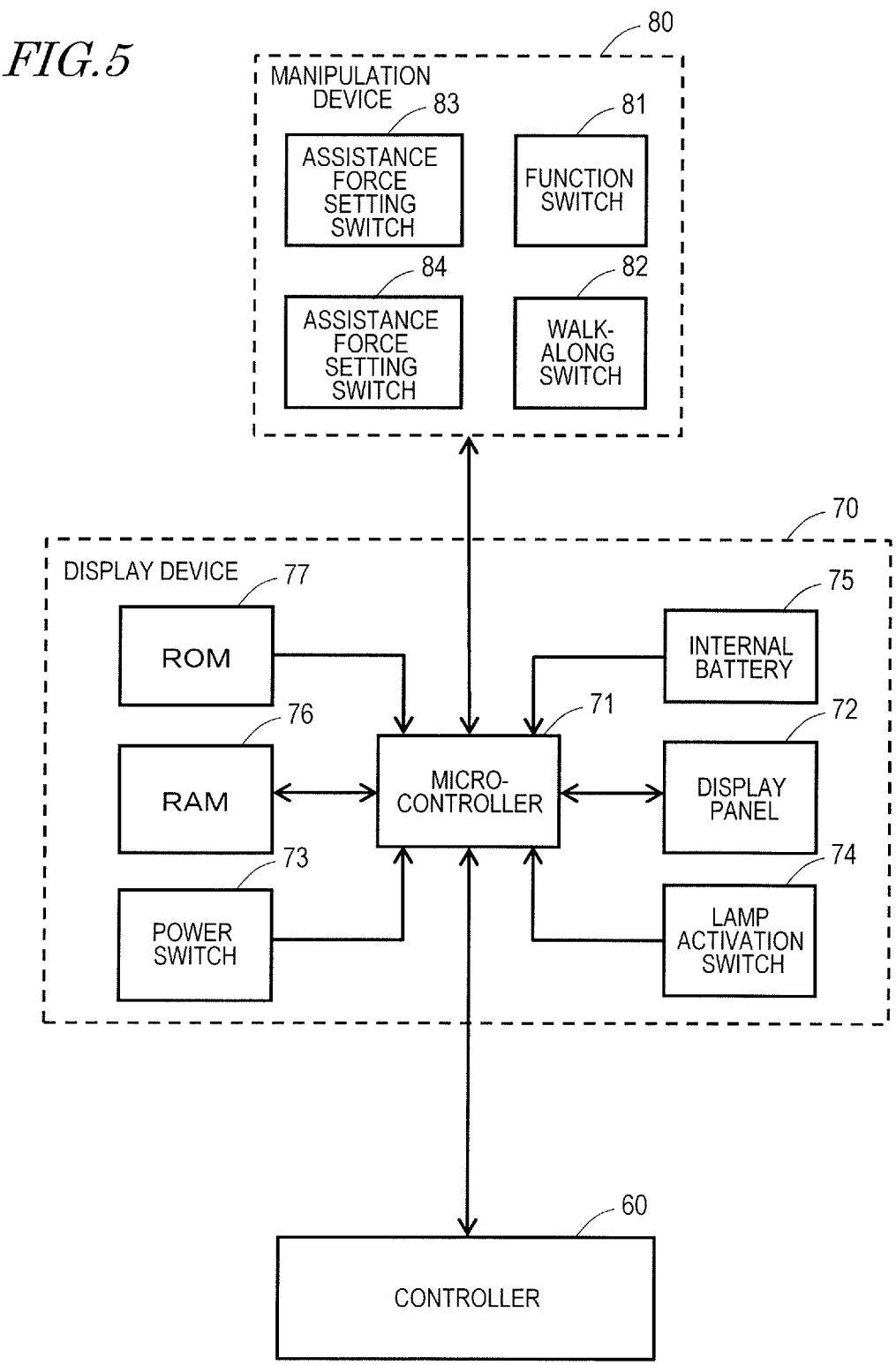
FIG. 5 is a hardware diagram of a display device and a manipulation device according to a preferred embodiment of the present invention.

FIG. 5 is a hardware diagram of the display device 70 and the manipulation device 80. The display device 70 includes a microcontroller 71, the display panel 72, the power switch 73, the lamp activation switch 74, an internal battery 75, a RAM 76, and a ROM 77.

The microcontroller 71 includes a control circuit which detects whether various switches on the display device 70 and the manipulation device 80 have been pressed, and controls the operation of the display device 70. The microcontroller 71 may include a semiconductor integrated circuit, for example. When the electrically assisted bicycle 1 is powered ON with the battery 56 attached thereto, the microcontroller 71 may operate by utilizing electric power which is supplied from the battery 56. The operation of the microcontroller 71 in a powered ON state may also utilize electric power from the internal battery 75. The internal battery 75 may be a primary battery such as a button battery, for example. The internal battery 75 may be a secondary battery that is capable of being charged.

The microcontroller 71 reads a computer program that is stored in the ROM 77, executes it in the RAM 76, and performs various processes. The RAM 76 and the ROM 77 may be provided within the microcontroller 71.

The microcontroller 71 detects pressing of various switches. For example, as the rider begins pressing a switch, the microcontroller 71 detects a voltage value and/or a current value which is of a predetermined magnitude or higher. Then, as the switch ceases to be pressed, the microcontroller 71 detects that the voltage value and/or current value that has hitherto been detected now equals zero, for example. The microcontroller 71 is able to concurrently detect more than one switch being pressed.

The microcontroller 71 transmits to the controller 60 signals in response to pressing of various switches on the display device 70 and the manipulation device 80. For example, when the walk-along switch 82 is pressed, the microcontroller 71 transmits to the controller 60 a signal indicating that the walk-along switch 82 has been pressed. Having received the signal, the controller 60 enters the walk-along mode, and performs a control that causes the electric motor 53 to generate an assistance force. Note that, without involving the display device 70, the manipulation device 80 and the controller 60 may be connected via wiring lines; in this case, the controller 60 directly detects the rider's switch operation of the manipulation device 80.

In the present preferred embodiment, the display device 70 and the manipulation device 80 are illustrated as being separately provided; however, the display device 70 and the manipulation device 80 may be constructed integrally. For example, component elements of both of the display device 70 and the manipulation device 80 may be provided within the same housing.

Next, the walk-along mode will be described. A blank arrow 112 shown in FIG. 4 indicates the rider's operation of pressing a switch with a finger or a thumb. In response to the rider keeping the walk-along switch 82 pressed, the electrically assisted bicycle 1 enters the walk-along mode.

When the rider keeps pressing the walk-along switch 82 with a finger or a thumb, while moving the electrically assisted bicycle 1 at reduced speed with the hand(s) and without the feet stepping on the pedals 55, the microcontroller 71 transmits to the controller 60 a signal indicating that the walk-along switch 82 is being kept pressed normally, for example. Having received the signal, the controller 60 enters the walk-along mode, and performs a control that causes the electric motor 53 to generate an assistance force. For example, the rider may keep pressing the walk-along switch 82 with the thumb of the left hand, while pushing on the left grip 34 (FIG. 4) of the handle 14 with the left hand. To "move at reduced speed" refers to the electrically assisted bicycle 1 being moved at a slow speed, e.g., greater than 0 km/h but smaller than about 6 km/h. Allowing the electric motor 53 to generate an assistance force during a walk-along reduces the burden of the rider. For example, this is able to reduce the burden of the rider when the rider is pushing forward the electrically assisted bicycle 1 with a hand while walking on foot and going up an ascent.

Once the rider ceases to keep pressing the walk-along switch 82, the walk-along mode is ended.

Figure 6:
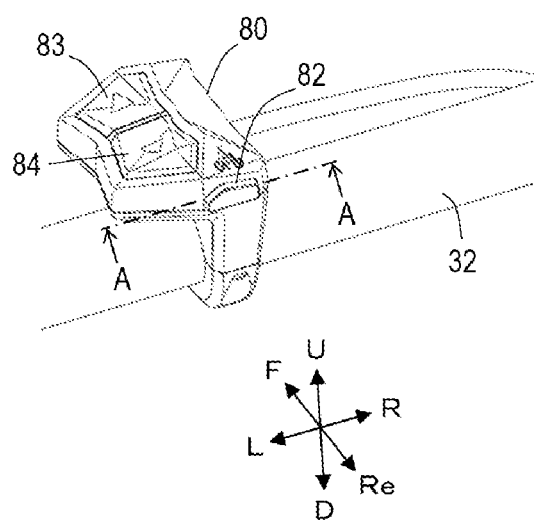
FIG. 6 is an isometric view of a walk-along switch according to a preferred embodiment of the present invention.

FIGS. 6A to 6C are cross-sectional views showing an exemplary structure of the walk-along switch 82. In the example shown in FIGS. 6A to 6C, the walk-along switch 82 has a DPDT (Double Pole Double Throw) structure. The switch structure shown in FIGS. 6A to 6C may also be called a double-action switch.

FIG. 6A shows the walk-along switch 82 when not being manipulated by the rider. On a circuit board 180, stationary contacts 181 and 184 are placed at a distance from each other. Between the stationary contacts 181 and 184, stationary contacts 182 and 183 are placed so as to be at a distance from each other. In the present preferred embodiment, the stationary contact 181 is referred to as the first electrical contact, and the stationary contact 182 is referred to as the second electrical contact.

At a position on the circuit board 180 outside of the stationary contacts 181 and 184, an annular-shaped base 196 is provided. As used herein, the "annular shape" is not limited to being a perfect circle; rather, a type of annular shape that resembles an elongated circle or a rectangular shape, or some other shape, may be used. The base 196 is connected to a movable member 191 via a skirt-shaped elastic member 193. The movable member 191 is connected to a movable member 192 via a skirt-shaped elastic member 194. The elastic members 193 and 194 are made of an elastic material such as rubber, for example. On the movable member 192, a button 195 to be touched by a finger or a thumb of the rider is provided.

At the position on the movable member 191 opposing the stationary contacts 181 and 184, an annular-shaped moving contact 185 is provided. At the positions on the movable member 192 opposing the stationary contacts 182 and 183, a moving contact 186 is provided. In this example, it is assumed that a voltage is being applied from the microcontroller 71 to the stationary contacts 183 and 184.

As shown in FIG. 6B, when the rider presses the button 195, the elastic member 193 first undergoes elastic deformation, so that the moving contact 185 comes in contact with the stationary contacts 181 and 184. Through this contact, electrical conduction is achieved between the stationary contact 181 and the stationary contact 184. When a voltage is supplied from the stationary contact 184 to the stationary contact 181 (first electrical contact) via the moving contact 185, the stationary contact 181 enters an ON state. As the stationary contact 181 enters an ON state, a signal having a voltage level representing the ON state is output from the stationary contact 181 to the microcontroller 71. Having received the signal, the microcontroller 71 detects that the stationary contact 181 is now in an ON state.

As shown in FIG. 6C, when the rider further presses the button 195, the elastic member 194 undergoes elastic deformation so that the moving contact 186 comes in contact with the stationary contacts 182 and 183. Through this contact, electrical conduction is achieved between the stationary contact 182 and the stationary contact 183. When a voltage is supplied from the stationary contact 183 to the stationary contact 182 (second electrical contact) via the moving contact 186, the stationary contact 182 enters an ON state. As the stationary contact 182 enters an ON state, a signal of a voltage representing the ON state is output from the stationary contact 182 to the microcontroller 71. Having received the signal, the microcontroller 71 detects that the stationary contact 182 is now in an ON state.

In a walk-along operation of the electrically assisted bicycle 1, it is expected that the electric motor 53 will not generate an assistance force unless the walk-along switch 82 is operated by the rider.

In order to prevent the electric motor 53 from generating an assistance force due to a malfunction or the like, two electrical contacts are provided, as explained above, to receive an instruction from the rider for the electric motor 53 to generate an assistance force. It is only when detecting that both of the two electrical contacts 181 and 182 have entered an ON state in response to the rider's operation that the electric motor 53 is allowed to generate an assistance force. When at least one of the electrical contacts 181 and 182 is in an OFF state, the electric motor 53 is not allowed to generate an assistance force. By providing two electrical contacts, the reliability of controlling the electric motor 53 as a motive power source is improved.

However, if a fault occurs such that one of the electrical contacts 181 and 182 remains perpetually in an ON state, the rider's operation of the other electrical contact alone might cause a misdetection that both of the electrical contacts 181 and 182 are in an ON state.

Accordingly, in the present preferred embodiment, the microcontroller 71 determines whether a state in which a first signal being output from the first electrical contact 181 and a second signal being output from the second electrical contact 182 both indicate OFF (hereinafter referred to as the "first state") is detected or not. After determining that the first state has been detected, the microcontroller 71 then determines whether a state in which the first signal and the second signal both indicate ON (hereinafter referred to as the "second state") is detected or not. If it is determined that the second state is detected after detection of the first state, then a control that causes the motor 53 to generate motive power is performed. In this case, the microcontroller 71 transmits a signal indicating that the walk-along switch 82 is kept pressed normally to the controller 60, for example. Having received the signal, the controller 60 enters the walk-along mode, and the electric motor 53 generates an assistance force. In the case in which the first state is not detected, the microcontroller 71 does not perform a control that causes the motor 53 to generate motive power, even if both of the first electrical contact 181 and the second electrical contact 182 take an ON state. For example, in the case in which the first state is not detected, the microcontroller 71 does not perform a control that causes the motor 53 to generate motive power, even if the second state is detected. For example, the microcontroller 71 does not transmit a signal indicating that the walk-along switch 82 is kept pressed normally to the controller 60. Since the signal is not received, the controller 60 does not enter the walk-along mode.

If a fault occurs such that at least one of the first electrical contact 181 and the second electrical contact 182 remains perpetually in an ON state, the first state will not be detected, and therefore a control that causes the motor 53 to generate motive power is not performed. The motor 53 is allowed to generate motive power only when, after confirming the existence of a state in which both of the first electrical contact 181 and the second electrical contact 182 become OFF, both of these contacts becoming ON is detected. This improves the reliability of controlling the motor 53.

Figure 7:
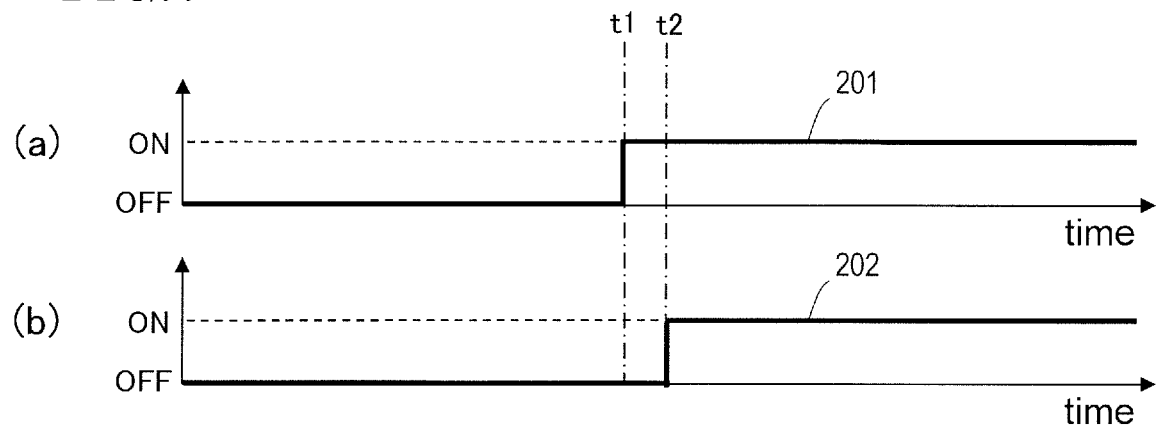
FIG. 7 includes: (a) a diagram showing a first signal which is output from a first electrical contact according to a preferred embodiment of the present invention; and (b) a diagram showing a second signal which is output from a second electrical contact according to a preferred embodiment of the present invention.

FIG. 7 includes (a) a diagram showing a first signal 201 which is output from the first electrical contact 181; and (b) a diagram showing a second signal 202 which is output from the second electrical contact 182. In (a) and (b) of FIG. 7, the horizontal axis represents time, and the vertical axis represents voltage.

In the example shown in FIG. 7, until time t1, the first signal 201 and the second signal 202 both indicate OFF, and therefore the first state is detected. As the first signal 201 indicates ON at time t1 and the second signal 202 indicates ON at time t2, the second state is detected. Since the second state is detected after detection of the first state, a control that causes the motor 53 to generate motive power is performed.

Figure 8:
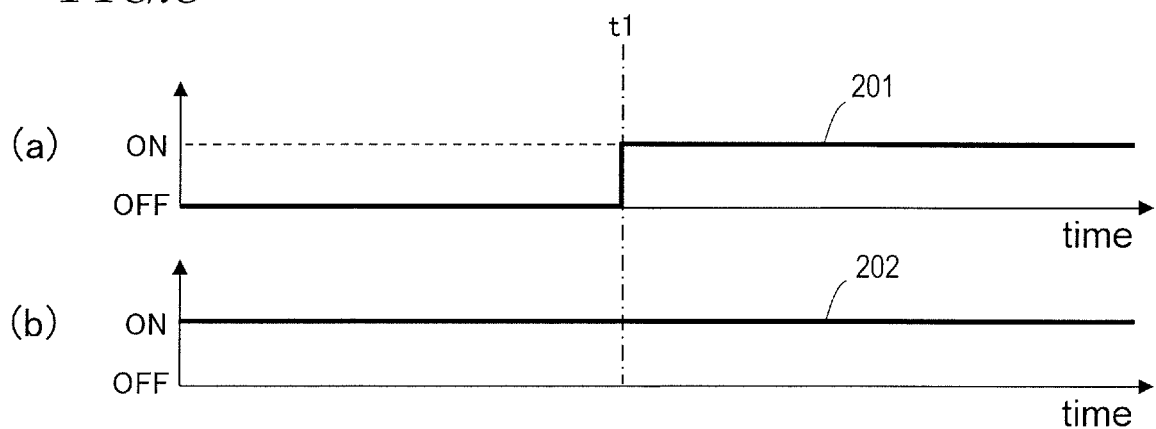
FIG. 8 includes: (a) a diagram showing a first signal which is output from a first electrical contact according to a preferred embodiment of the present invention; and (b) a diagram showing a second signal which is output from a second electrical contact according to a preferred embodiment of the present invention.

FIG. 8 includes (a) a diagram showing a first signal 201 which is output from the first electrical contact 181; and (b) a diagram showing a second signal 202 which is output from the second electrical contact 182. In (a) and (b) of FIG. 8, the horizontal axis represents time, and the vertical axis represents voltage.

In the example shown in FIG. 8, a fault is occurring such that the electrical contact 182 remains perpetually in an ON state. As a result, although the first signal 201 indicates OFF at a point in time prior to time t1, the second signal 202 indicates ON; therefore, the first state is not detected. As the first signal 201 indicates ON at time t1, the second state is detected. However, since the first state has not been detected, even if the second state is detected, a control that causes the motor 53 to generate motive power is not performed.

When a fault occurs such that at least one of the first electrical contact 181 and the electrical contact 182 remains perpetually in an OFF state, the second state is not detected, and therefore a control that causes the motor 53 to generate motive power is not performed.

The walk-along switch 82 illustrated in FIGS. 6A to 6C is a switch of the normally-open type, such that its conducting state defines the ON state and its non-conducting state defines the OFF state. As the walk-along switch 82 in the present preferred embodiment, a switch of the normally-closed type may alternatively be used. When a normally-closed switch is used in the present preferred embodiment, its conducting state shall define the OFF state and its non-conducting state shall define the ON state.

Next, details of the walk-along mode process will be described. Like processes will be denoted by like reference numerals, and any identical description will not be repeated. Although the microcontroller 71 will be illustrated as executing the respective processes in the following description, the microcontroller 71 and the controller 60 may cooperate in executing the respective processes, or the controller 60 may execute the respective processes. Moreover, a combined process may also be used in which the processes as described with reference to FIGS. 9 through 14 are combined as appropriate.

Figure 9:
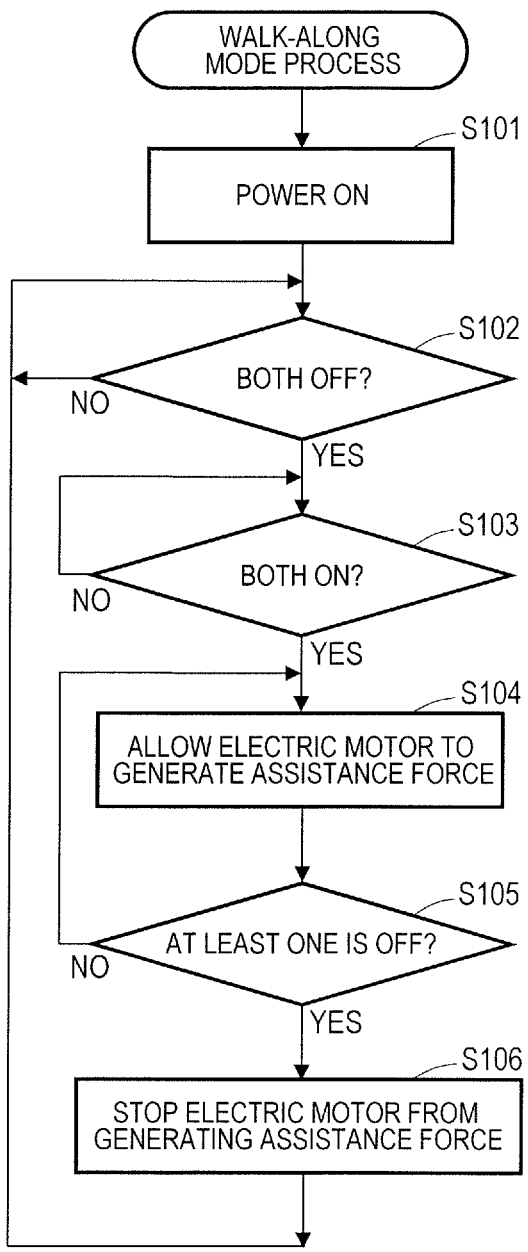
FIG. 9 is a flowchart showing an example of a process in a walk-along mode according to a preferred embodiment of the present invention.

FIG. 9 is a flowchart showing a process in the walk-along mode.

At step S101, if the rider presses the power switch 73, the electrically assisted bicycle 1 is powered ON, and the drive unit 51 begins to operate.

At step S102, the microcontroller 71 determines whether the first signal 201 and the second signal 202 both indicate OFF. If at least one of the first signal 201 and the second signal 202 does not indicate OFF, any further processing is withheld until the first state, in which the first signal 201 and the second signal 202 both indicate OFF, is detected.

Upon determining that the first state is detected, the microcontroller 71 proceeds to the process of step S103. At step S103, the microcontroller 71 determines whether the first signal 201 and the second signal 202 both indicate ON or not. The microcontroller 71 waits until determining that the second state, in which the first signal 201 and the second signal 202 both indicate ON, is detected. Upon determining that the second state is detected, the microcontroller 71 performs a control that causes the electric motor 53 to generate an assistance force (step S104). The microcontroller 71 transmits a signal indicating that the walk-along switch 82 is kept pressed normally to the controller 60. Having received the signal, the controller 60 enters the walk-along mode, and the electric motor 53 generates an assistance force.

At step S105, upon detecting that at least one of the first signal 201 and the second signal 202 indicates OFF, the control that causes the electric motor 53 to generate an assistance force is stopped (step S106). After the control that causes the electric motor 53 to generate an assistance force is stopped, the process of step S102 is performed again.

In the process shown in FIG. 9, so long as the first state, i.e., the first signal 201 and the second signal 202 both indicate OFF, is not detected, the control stays at step S102, and thus a control that causes the electric motor 53 to generate an assistance force is not performed. Note that, even if the first state is not detected, the rider's switch operation may still cause the first electrical contact 181 and the second electrical contact 182 to both indicate an ON state; however, since the first state has not been detected, a control that causes the motor 53 to generate motive power is not performed. This improves the reliability of controlling the electric motor 53 that generates the assistance force to move the electrically assisted bicycle 1.

In the example shown in FIG. 9, if it is detected at step S105 that at least one of the first signal 201 and the second signal 202 indicates OFF, the control that causes the electric motor 53 to generate an assistance force is stopped, and thereafter the process of step S102 is again performed. However, the process of step S102 may be performed only at the time of powering ON.

Figure 10:
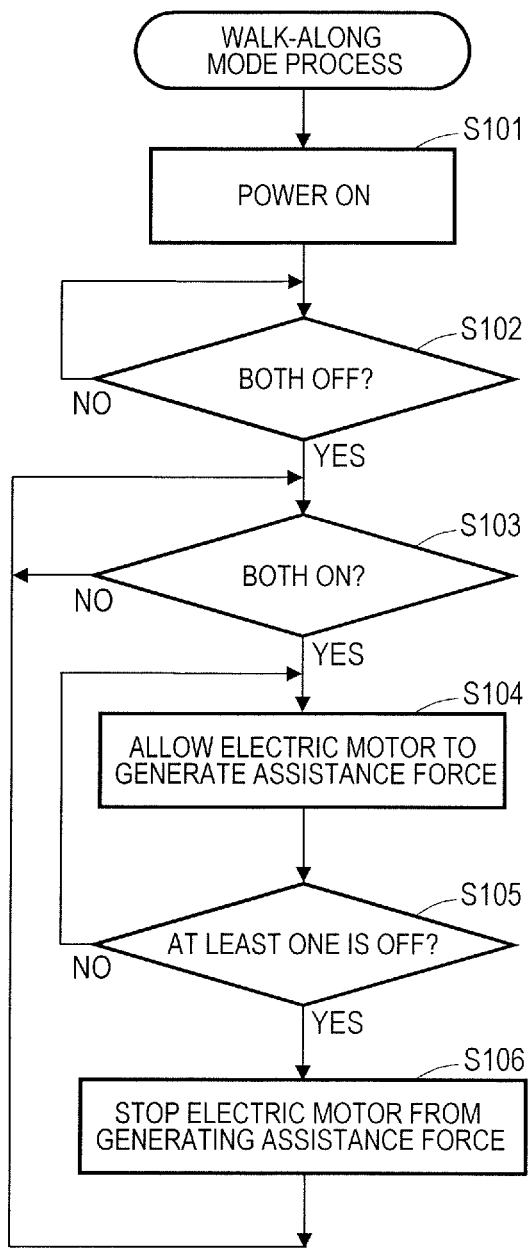
FIG. 10 is a flowchart showing another example of a process in the walk-along mode according to a preferred embodiment of the present invention.

FIG. 10 is a flowchart showing another example of a process in the walk-along mode.

In the example shown in FIG. 10, if it is detected at step S105 that at least one of the first signal 201 and the second signal 202 indicates OFF, the control that causes the electric motor 53 to generate an assistance force is stopped, and thereafter the process of step S103 is performed again. The other processes are identical to those shown in FIG. 9, and the description thereof will be omitted.

In the example shown in FIG. 10, the process of step S102 is performed only at the time of powering ON. In the case in which the frequency of powering ON and OFF the electrically assisted bicycle 1 is sufficiently shorter than the MTBF (Mean Time Between Failures) of the walk-along switch 82, etc., it may be effective to perform the process of step S102 only at the time of powering ON.

Even if the rider intends to continue the operation of pressing the walk-along switch 82, depending on how the rider's operation is actually performed, vibration of the electrically assisted bicycle 1, etc., at least one of the first and second electrical contacts 181 and 182 may temporarily come into an OFF state. In such cases, even without again determining whether the first state is detected or not, the control that causes the electric motor 53 to generate an assistance force may be resumed as soon as the second state is detected again. This provides an improved ease of use of the electrically assisted bicycle 1.

Figure 11:
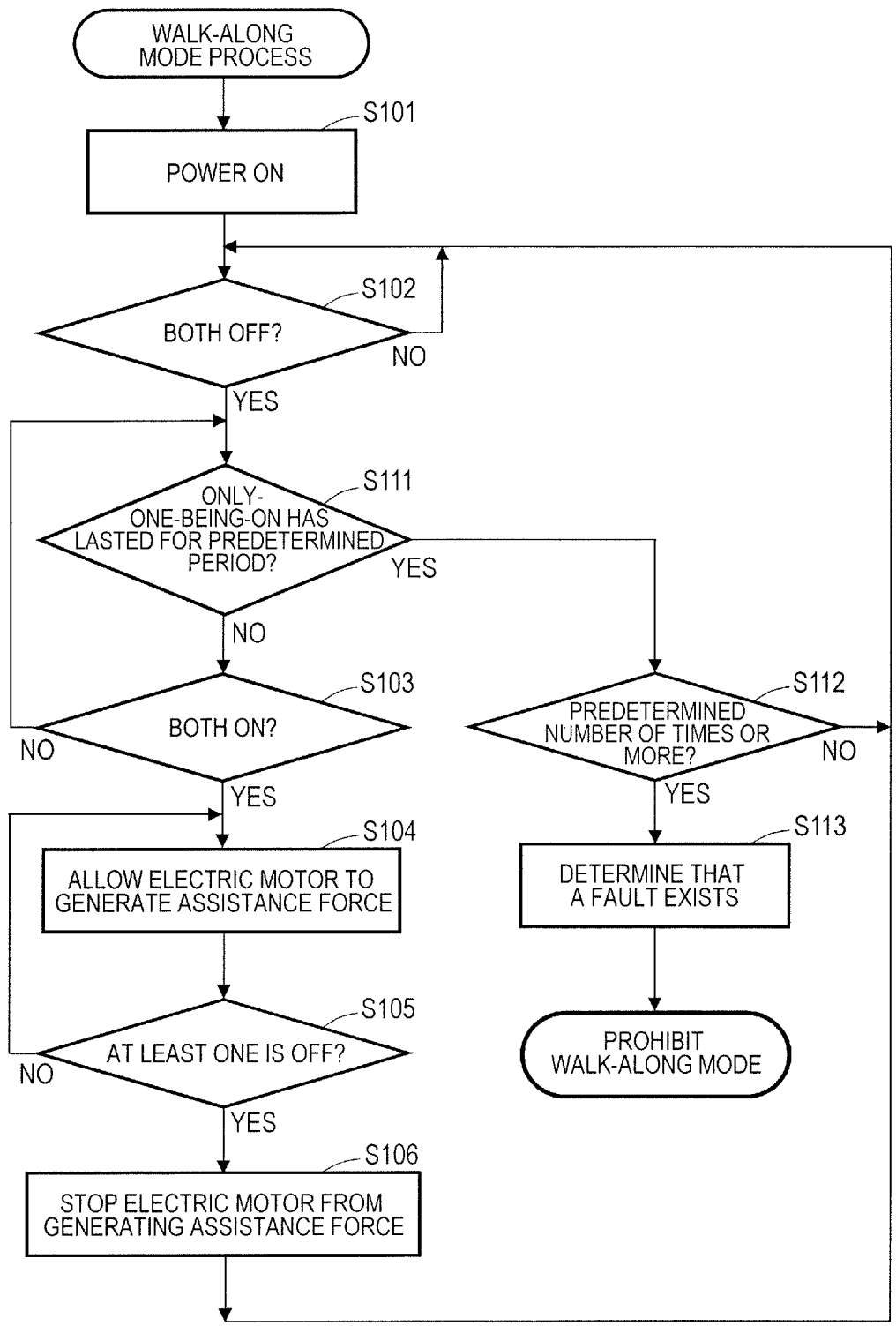
FIG. 11 is a flowchart showing still another example of a process in the walk-along mode according to a preferred embodiment of the present invention.

FIG. 11 is a flowchart showing still another example of a process in the walk-along mode.

In the example shown in FIG. 11, if the first state is detected at step S102, the control proceeds to the process of step 111. At step S111, it is determined whether a state in which one of the first signal 201 and the second signal 202 indicates ON but the other indicates OFF (hereinafter referred to as the "third state") lasts for a first predetermined period of time or not. The first predetermined period of time may be, e.g., about 2 seconds, although this is not a limitation; another length of time may be used.

So long as the first and second electrical contacts 181 and 182 are both normal, there may be some difference between the points in time at which the first electrical contact 181 and the second electrical contact 182 take an ON state, but both will take an ON state within the first predetermined period of time from the rider's operation.

On the other hand, in the presence of a fault such that one of the first and second electrical contacts 181 and 182 can never take an ON state, one of the first and second electrical contacts 181 and 182 will remain in an OFF state, despite the rider's operation.

If it is determined that the third state has lasted for the first predetermined period of time, the control proceeds to the process of step S112. At step S112, the microcontroller 71 determines whether or not the third state, lasting for the first predetermined period of time, has occurred a first predetermined number of times or more. The first predetermined number of times may be, e.g., 5 times, although this is not limitation; it may be another number of times.

If it is determined that the third state, lasting for the first predetermined period of time, has not occurred the first predetermined number of times or more, the control returns to the process of step S102.

Recognizing that the electric motor 53 does not generate an assistance force, the rider may try to press the walk-along switch 82 again. As the operation is tried again, the first state will be again detected. If a fault exists, after the redetection of the first state, the third state lasting for the predetermined period of time will be detected again. At step S112, if it is determined that the third state lasting for the first predetermined period of time has occurred the first predetermined number of times or more, the microcontroller 71 determines that a fault exists (step S113), and prohibits the walk-along mode. As a result, a control that causes the electric motor 53 to generate an assistance force is not performed. This improves the reliability of controlling the electric motor 53. Moreover, when it is determined that a fault exists, the fault may be reported to the rider, as will be described later.

At steps S111 and S103, if it is determined that the second state is detected before the first predetermined period of time elapses since detection of the third state, the microcontroller 71 performs a control that causes the electric motor 53 to generate an assistance force (step S104). Even if the rider has pressed the walk-along switch 82, depending on how the rider's operation is actually performed, one of the first and second electrical contacts 181 and 182 may take a longer time before going into an ON state. If one of the first and second electrical contacts 181 and 182 takes an ON state within the first predetermined period of time since the other takes an ON state, a control that causes the electric motor 53 to generate an assistance force is performed. This provides an improved ease of use of the electrically assisted bicycle 1.

Moreover, if the second state is detected before the third state lasting for the first predetermined period of time has occurred the first predetermined number of times, the microcontroller 71 performs a control that causes the electric motor 53 to generate an assistance force (step S104). If the third state is not repeated the first predetermined number of times or more, and yet the second state is detected, a control that causes the electric motor 53 to generate an assistance force is performed, thus providing an improved ease of use of the electrically assisted bicycle 1.

Figure 12:
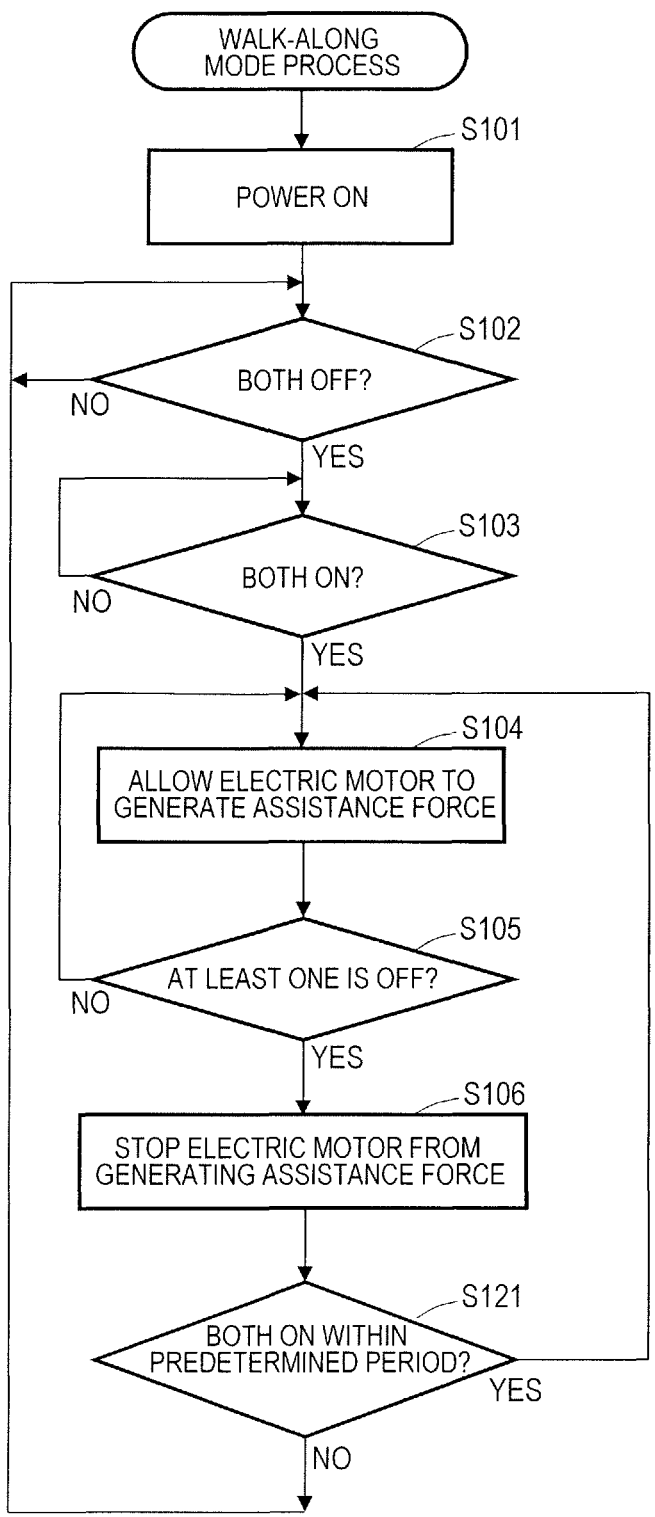
FIG. 12 is a flowchart showing still another example of a process in the walk-along mode according to a preferred embodiment of the present invention.

FIG. 12 is a flowchart showing still another example of a process in the walk-along mode.

In the example shown in FIG. 12, at step S105, the microcontroller 71 determines whether a state in which at least one of the first signal 201 and the second signal 202 indicates OFF (hereinafter referred to as the "fourth state") is detected or not. If it is determined that the fourth state is detected, the microcontroller 71 stops the control that causes the electric motor 53 to generate an assistance force (step S106). After the process of step S106, the control proceeds to the process of step S121. At step S121, the microcontroller 71 determines whether, after detection of the fourth state, the second state is again detected within a second predetermined period of time. The second predetermined period of time may be, e.g., about 500 milliseconds, although this is not a limitation; another length of time may be used. If it is determined that the second state is again detected within the second predetermined period of time, the control returns to the process of step S104 to resume the control that causes the electric motor 53 to generate an assistance force.

Even if the rider intends to continue pressing the walk-along switch 82, depending on how the rider's operation is actually performed, vibration of the electrically assisted bicycle 1, etc., at least one of the first and second electrical contacts 181 and 182 may temporarily come into an OFF state. Even without again determining whether the first state is detected or not, the control that causes the electric motor 53 to generate an assistance force may be resumed, thus providing an improved ease of use of the electrically assisted bicycle 1.

If the second state is not detected again within the second predetermined period of time at step S121, the control returns to the process of step S102, in which it is again determined whether the first state is detected or not.

When the rider's operation is improper, or a fault occurs such that at least one of the first and second electrical contacts 181 and 182 can never take an ON state, the second state will not be detected again within the second predetermined period of time. In such a case, the control returns to the process of determining whether the first state is detected or not. If the rider's operation was improper, the rider may now retry a proper operation, thus allowing the electric motor 53 to generate an assistance force. In the presence of a fault such that at least one of the first and second electrical contacts 181 and 182 can never take an ON state, the electric motor 53 is not allowed to generate an assistance force. This improves the reliability of controlling the electric motor 53.

Figure 13:
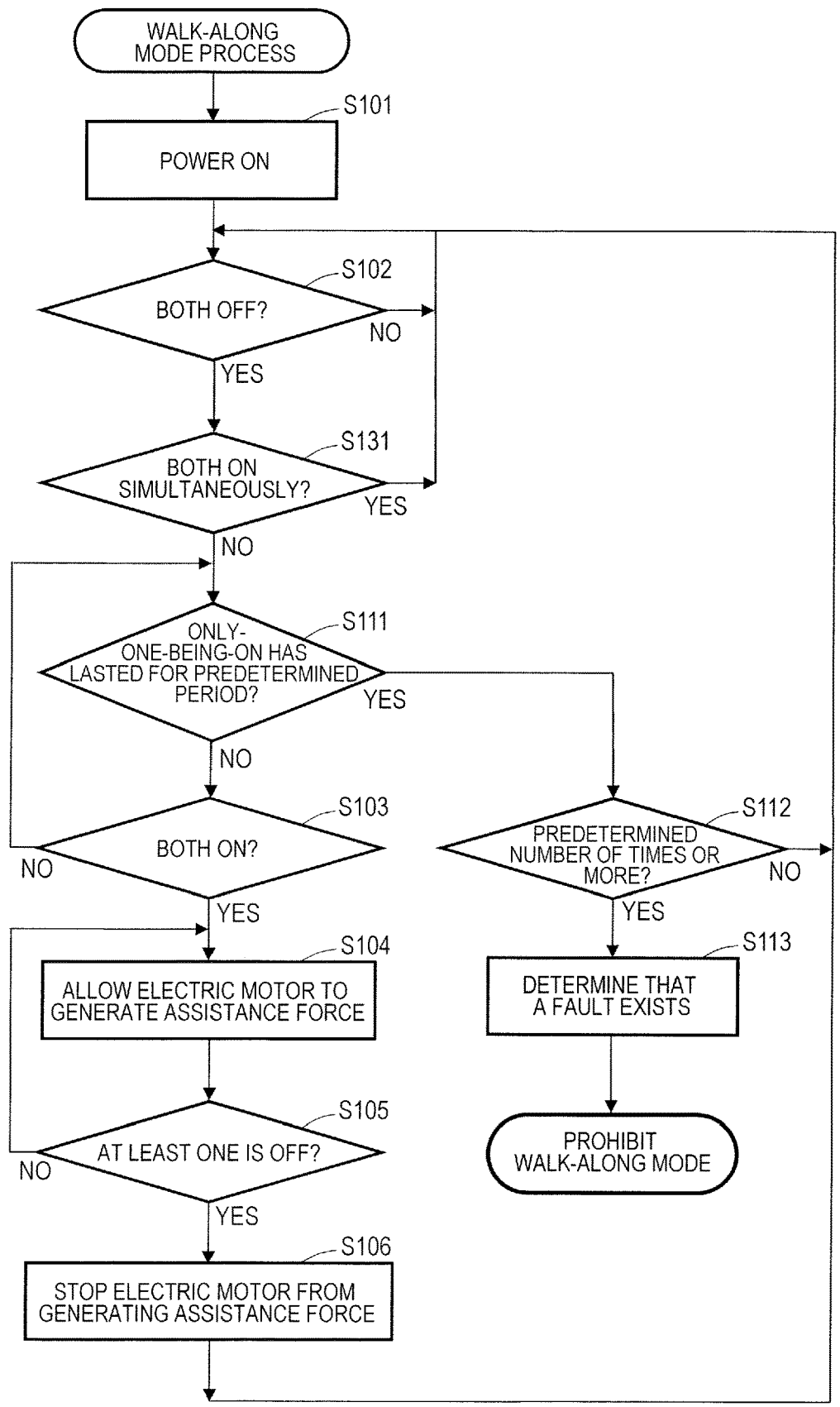
FIG. 13 is a flowchart showing still another example of a process in the walk-along mode according to a preferred embodiment of the present invention.

FIG. 13 is a flowchart showing still another example of a process in the walk-along mode.

In the example shown in FIG. 13, if the first state is detected at step S102, the control proceeds to the process of step S131. At step S131, the microcontroller 71 determines whether a state in which the second signal 202 indicates ON within a third predetermined period of time since the first signal 201 indicates ON (hereinafter referred to as "fifth state") is detected or not. The third predetermined period of time may be, e.g., about 4 milliseconds, although this is not a limitation; another length of time may be used. The third predetermined period of time may be any length of time that is smaller than a difference between points in time at which the first electrical contact 181 and the second electrical contact 182 become ON, as may exist when, for example, the rider quickly presses the walk-along switch 82.

If it is determined that the fifth state is detected, the microcontroller 71 returns to the process of step S102, and a control that causes the electric motor 53 to generate an assistance force is not performed.

During normal operation, a difference exists between points in time at which the first electrical contact 181 and the second electrical contact 182 become ON. However, if the first electrical contact 181 and the second electrical contact 182 are short-circuited to each other, the first signal 201 and the second signal 202 may simultaneously indicate ON in response to the rider's operation.

If the second signal 202 indicates ON within the third predetermined period of time since the first signal 201 indicates ON, it is possible that the first electrical contact 181 and the second electrical contact 182 may be short-circuited to each other. Therefore, the electric motor 53 is not allowed to generate an assistance force. This improves the reliability of controlling the electric motor 53.

Moreover, if it is determined that the fifth state is detected, it is again determined whether the first state is detected or not. Recognizing that an assistance force is not generated, the rider may try to press the walk-along switch 82 again. As the pressing is tried again, the first state will be again detected. If short-circuiting exists, after the redetection of the first state, the fifth state will be again detected; therefore, a control that causes the electric motor 53 to generate an assistance force is not performed. This improves the reliability of controlling the electric motor 53.

If the first electrical contact 181 and the second electrical contact 182 are not short-circuited to each other, the normal control of allowing the electric motor 53 to generate an assistance force is performed. If it is determined that the fifth state is not detected, and yet the second state is detected, the microcontroller 71 performs a control that causes the electric motor 53 to generate an assistance force (steps S131, S111, S103, S104).

Figure 14:
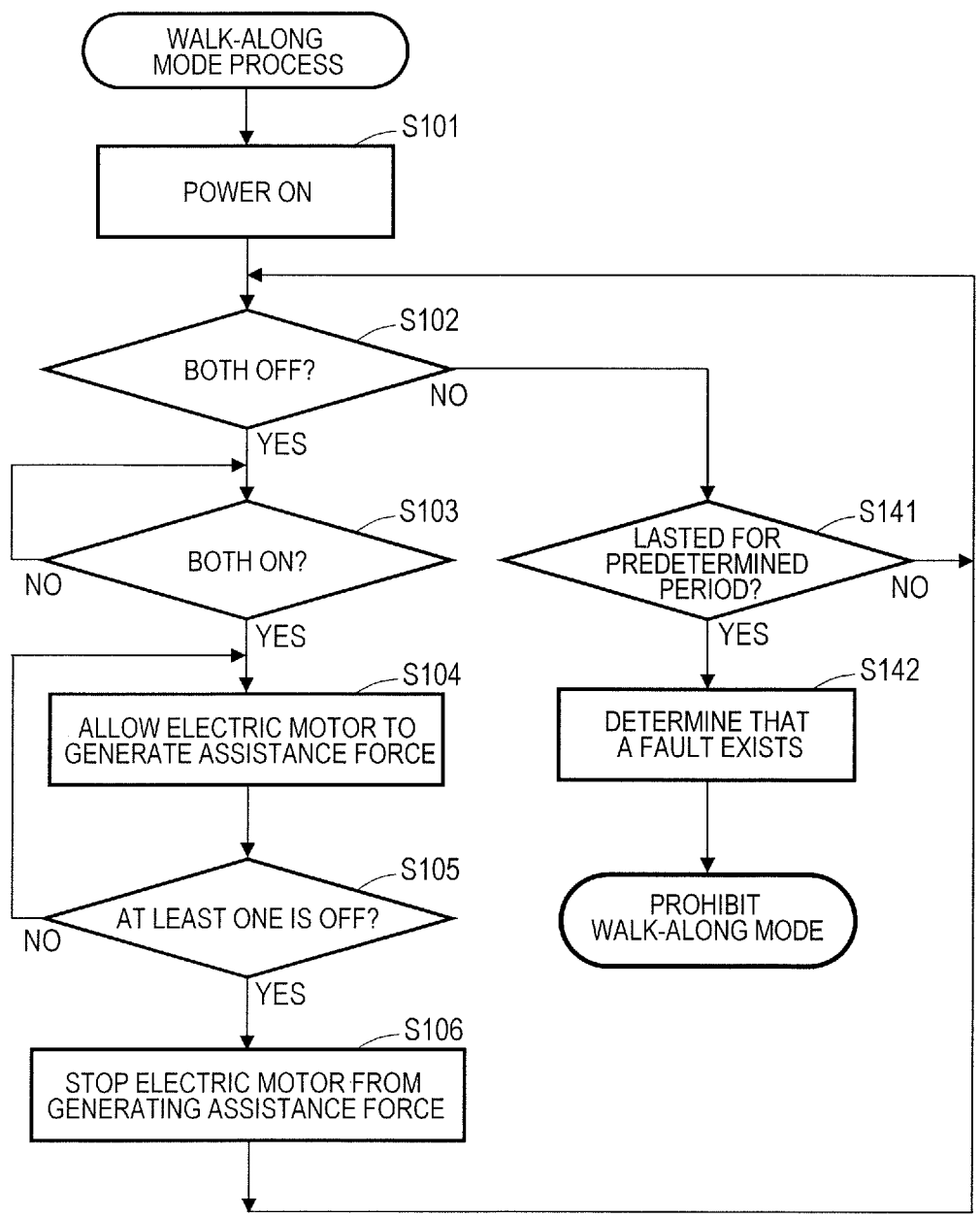
FIG. 14 is a flowchart showing still another example of a process in the walk-along mode according to a preferred embodiment of the present invention.

FIG. 14 is a flowchart showing still another example of a process in the walk-along mode.

In the example shown in FIG. 14, if the first state is not detected at step S102, the control proceeds to the process of step S141. At step S141, the microcontroller 71 determines whether a state in which the first state is continuously undetected (hereinafter referred to as the sixth state) lasts for a fourth predetermined period of time or not. The fourth predetermined period of time may be, e.g., about 60 seconds, although this is not a limitation; another length of time may be used.

If it is determined that the sixth state has not lasted for the fourth predetermined period of time, the control returns to the process of step S102. If it is determined that the sixth state has lasted for the fourth predetermined period of time, the microcontroller 71 determines that at least one of the first electrical contact 181 and the second electrical contact 182 is faulty (step S142).

If a fault occurs such that at least one of the first electrical contact 181 and the second electrical contact 182 remains perpetually in an ON state, the first state will not be detected. If the sixth state, in which the first state is continuously undetected, lasts for the fourth predetermined period of time, it is determined that a fault exists. A control that causes the electric motor 53 to generate an assistance force is not performed. This improves the reliability of controlling the electric motor 53. Moreover, when it is determined that a fault exists, the fault may be reported to the rider.

Figure 16:
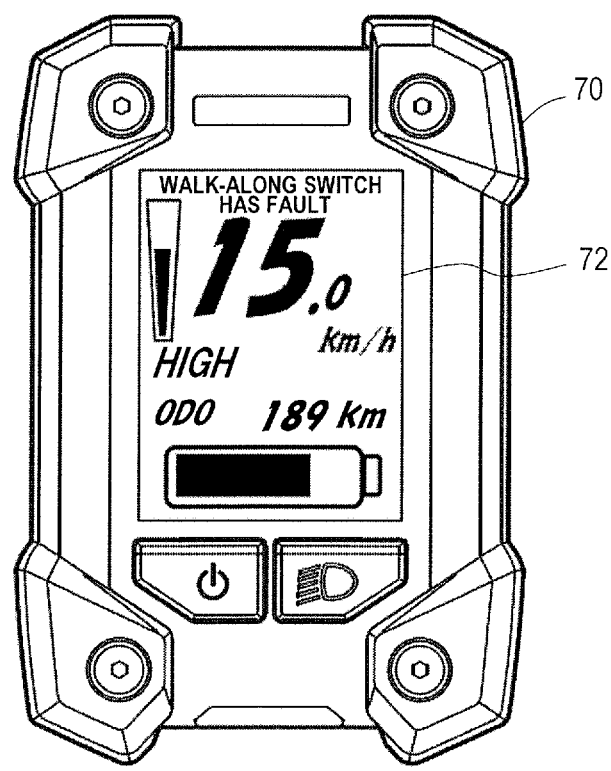
FIG. 16 is a diagram showing an operation of reporting the existence of a fault in the walk-along switch according to a preferred embodiment of the present invention.

FIG. 15 and FIG. 16 are diagrams showing example operations in which the existence of a fault in the walk-along switch 82 is reported. When a fault occurs, the microcontroller 71 may change the color of a portion of the display panel 72, for example. In the example shown in FIG. 15, the color of the display area 131 is changed. Moreover, as shown in FIG. 16, the existence of a fault may be reported by text. By checking what is displayed on the display device 70, the rider is able to recognize the existence of a fault of the walk-along switch 82.

Figure 17:
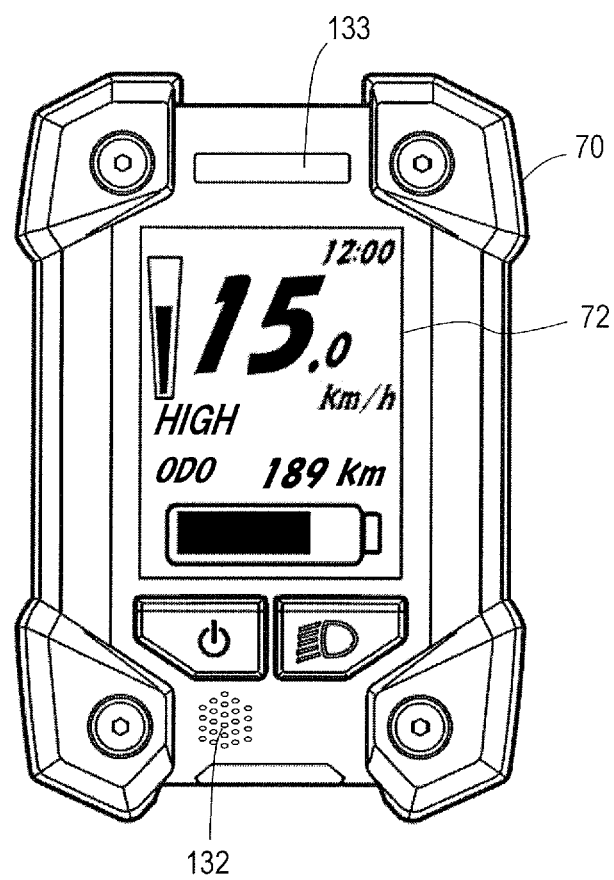
FIG. 17 is a diagram showing alarms according to a preferred embodiment of the present invention.

Moreover, the electrically assisted bicycle 1 may include one or more alarms to report the existence of a fault of the walk-along switch 82. FIG. 17 shows a display device 70 which includes a loudspeaker 132 and a lamp 133, as examples of the one or more alarms. For example, the loudspeaker 132 may generate an audio (sound) in order to report the existence of a fault to the rider. For example, the lamp 133 may be activated or flickered in order to report the existence of a fault to the rider. With the audio and light, the rider is able to recognize the existence of a fault. Note that the display device 70 may not include both of the loudspeaker 132 and the lamp 133, but may include only one of them.

Although the above examples illustrate the first electrical contact 181 and the second electrical contact 182 as being provided within the same housing of the walk-along switch 82, they may be provided as separate switches.

Figure 18:
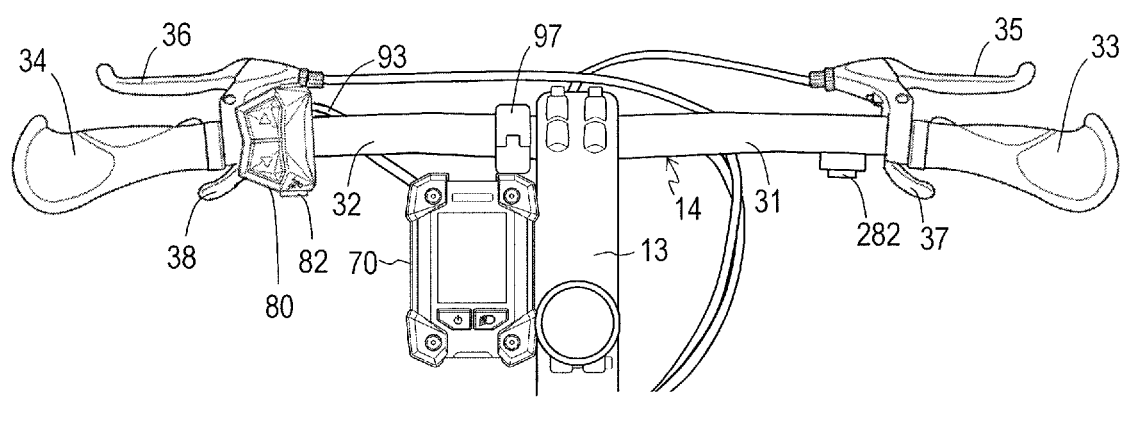
FIG. 18 is a diagram showing an electrically assisted bicycle which includes two walk-along switches according to a preferred embodiment of the present invention.
Figure 18:
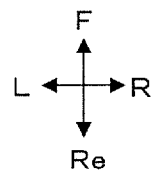

FIG. 18 is a diagram showing an electrically assisted bicycle 1 including two walk-along switches 82 and 282. In the example shown in FIG. 18, the first electrical contact is provided in the walk-along switch 82, and the second electrical contact is provided in the walk-along switch 282. In this example, the walk-along switches 82 and 282 are switches of the single-pole single-throw switch type. The walk-along switch 282 is provided on the right handle bar 31. As the rider presses the walk-along switch 82 with the left hand, the first electrical contact takes an ON state. As the rider presses the walk-along switch 282 with the right hand, the second electrical contact takes an ON state. If it is determined that the second state is detected after detection of the first state, the microcontroller 71 performs a control that causes the electric motor 53 to generate an assistance force. This improves the reliability of controlling the electric motor 53.

Although the above preferred embodiments illustrate a two-wheeled electrically assisted bicycle as an example of the electrically assisted bicycle, the present invention is not limited thereto. For example, the electrically assisted bicycle may be an electrically assisted bicycle having three or more wheels.

Although the above preferred embodiments illustrate that the drive wheel to which the human force generated by the rider stepping on the pedals and the assistance force generated by the electric motor are transmitted is the rear wheel, the present invention is not limited thereto. Depending on the implementation of the electrically assisted bicycle, the human force and the assistance force may be transmitted to the front wheel, or transmitted to both of the front wheel and the rear wheel.

In the above preferred embodiments, the vehicle is an electrically assisted bicycle; however, it may be a vehicle other than an electrically assisted bicycle. For example, the vehicle may be a four-wheeled vehicle. Moreover, the vehicle may be a so-called "senior car" (mobility scooter), for example. Moreover, preferred embodiments of the present invention are applicable not only to a vehicle including an internal combustion engine as a motive power source, but also to a hybrid system in which both an electric motor and an internal combustion engine are used.

In the above preferred embodiments, a control which is based on an ON state and an OFF state of the first electrical contact 181 and the electrical contact 182 is applied to the walk-along mode; however, the control may be applied to an operation other than a walk-along. The preferred embodiments of the present invention are also applicable to a control of a motive power source that generates motive power for the usual travel of a vehicle, for example.

In the above preferred embodiments, the switch which toggles between the ON state and the OFF state of the first electrical contact 181 and the electrical contact 182 is preferably a push button switch, but may also be another type of switch. For example, it may be a slide switch, or a lever-type switch. Moreover, the switch may have a throttle structure, such that the rider is able to toggle between the ON state and the OFF state of the first electrical contact 181 and the electrical contact 182 by turning the throttle. Moreover, the switch may have a pedal structure, such that the rider is able to toggle between the ON state and the OFF state of the first electrical contact 181 and the electrical contact 182 by manipulating the pedal with a foot. Moreover, two different types of switches may be provided, so that one switch toggles between the ON state and the OFF state of the first electrical contact 181, and the other switch toggles between the ON state and the OFF state of the second electrical contact 182.

Thus, preferred embodiments of the present invention have been described.

A drive system 51 according to a preferred embodiment of the present invention preferably includes an electric motor 53 to generate motive power to cause the electrically assisted bicycle 1 to move, a first electrical contact 181 and a second electrical contact 182 each of which switches between an ON state and an OFF state in response to the rider's operation, and a microcontroller 71 to receive a first signal 201 regarding a state of the first electrical contact 181 and a second signal 202 regarding a state of the second electrical contact 182, and to control an operation of the electric motor 53 in accordance with the first signal 201 and the second signal 202. The microcontroller 71 determines whether a first state, in which the first signal 201 and the second signal 202 both indicate OFF, is detected or not. After determining that the first state is detected, the microcontroller 71 then determines whether a second state, in which the first signal 201 and the second signal 201 both indicate ON, is detected or not. When it is determined that the second state is detected after detection of the first state, then a control that causes the electric motor 53 to generate motive power is performed. While the first state is not detected, even when the first electrical contact 181 and the second electrical contact 182 take an ON state, the microcontroller 71 does not perform a control that causes the electric motor 53 to generate motive power.

In a walk-along operation of the electrically assisted bicycle 1, it is expected that the electric motor 53 will not generate an assistance force unless the walk-along switch 82 is operated by the rider.

In order to prevent the electric motor 53 from generating an assistance force due to a malfunction or the like, two electrical contacts are preferably provided to receive an instruction from the rider for the electric motor 53 to generate an assistance force. Only when detecting that both types of electrical contacts have entered an ON state in response to the rider's operation, the electric motor 53 is allowed to generate an assistance force. When at least one of the two types of electrical contacts is in an OFF state, the electric motor 53 is not allowed to generate an assistance force. By providing two electrical contacts, the reliability of controlling the electric motor is improved.

However, if a fault occurs such that one of the two types of electrical contacts remains perpetually in an ON state, the rider's operation of the other electrical contact alone might cause a misdetection that both of the electrical contacts are in an ON state.

A drive system 51 according to a preferred embodiment of the present invention preferably includes a first electrical contact 181 and a second electrical contact 182. The microcontroller 71 determines whether a first state, in which a first signal 201 regarding a state of the first electrical contact 181 and a second signal 202 regarding a state of the second electrical contact 182 both indicate OFF, is detected or not. The microcontroller 71 determines whether a second state, in which the first signal 201 and the second signal 201 both indicate ON, is detected or not. When it is determined that the second state is detected after detection of the first state, then a control that causes the electric motor 53 to generate motive power is performed. While the first state is not detected, even if the first electrical contact 181 and the second electrical contact 182 take an ON state, the microcontroller 71 does not perform a control that causes the electric motor 53 to generate motive power.

If a fault occurs such that at least one of the first electrical contact 181 and the second electrical contact 182 remains perpetually in an ON state, the first state will not be detected, and therefore a control that causes the electric motor 53 to generate motive power is not performed. The electric motor 53 is allowed to generate motive power only when, after confirming the existence of a state in which both of the first electrical contact 181 and the second electrical contact 182 become OFF, both of these contacts becoming ON is detected. This improves the reliability of controlling the electric motor 53.

According to a preferred embodiment of the present invention, after determining that the first state is detected, the microcontroller 71 determines whether a third state, in which one of the first signal 201 and the second signal 202 indicates ON but the other indicates OFF, lasts for a first predetermined period of time or not. When it is determined that the third state has lasted for the first predetermined period of time, the microcontroller 71 again determines whether the first state is detected or not, and, after determining again that the first state is detected, again determines whether the third state lasts for the first predetermined period of time or not. The microcontroller 71 determines whether or not the third state lasting for the first predetermined period of time has occurred a first predetermined number of times or more; when it is determined that the third state lasting for the first predetermined period of time has occurred the first predetermined number of times or more, a control that causes the electric motor 53 to generate motive power may not be performed.

So long as the first and second electrical contacts 181 and 182 are both normal, there may be some difference between the points in time at which the first electrical contact 181 and the second electrical contact 182 take an ON state, but both will take an ON state within a predetermined period of time from the rider's operation.

On the other hand, in the presence of a fault such that one of the first and second electrical contacts 181 and 182 can never take an ON state, one of the first and second electrical contacts 181 and 182 will remain in an OFF state, despite the rider's operation. In this case, the second state will not be detected, and therefore the electric motor 53 will not generate motive power. Recognizing that motive power is not generated, the rider may try an operation that manipulates the first and second electrical contacts 181 and 182 again. As the operation is tried again, the first state will be again detected. If the fault exists, after the redetection of the first state, the third state lasting for the predetermined period of time will be detected again.

If the third state lasting for the first predetermined period of time has occurred the first predetermined number of times or more, a control that causes the electric motor 53 to generate motive power is not performed. This improves the reliability of controlling the electric motor 53.

According to a preferred embodiment of the present invention, when it is determined that the second state is detected before the first predetermined period of time elapses since detection of the third state, the microcontroller 71 may perform a control that causes the electric motor 53 to generate motive power.

Even if the rider has performed an operation to manipulate the first and second electrical contacts 181 and 182, depending on how the rider's operation is actually performed, one of the first and second electrical contacts 181 and 182 may take a longer time before going into an ON state. If one of the first and second electrical contacts 181 and 182 takes an ON state within a predetermined period of time since the other takes an ON state, a control that causes the electric motor 53 to generate motive power is performed, thus providing an improved ease of use of the electrically assisted bicycle 1.

According to a preferred embodiment of the present invention, it is determined that the second state is detected before the third state lasting for the first predetermined period of time has occurred the first predetermined number of times, the microcontroller 71 may perform a control that causes the electric motor 53 to generate motive power.

Even if the rider has performed an operation to manipulate the first and second electrical contacts 181 and 182, depending on how the rider's operation is actually performed, one of the first and second electrical contacts 181 and 182 may take a longer time before going into an ON state. If the third state is not repeated the first predetermined number of times or more, a control that causes the electric motor 53 to generate motive power is performed, thus providing an improved ease of use of the electrically assisted bicycle 1.

According to a preferred embodiment of the present invention, after determining that the first state and the second state are detected, the microcontroller 71 determines whether a fourth state, in which at least one of the first signal 201 and the second signal 202 indicates OFF, is detected or not. When it is determined that the fourth state is detected, the control that causes the electric motor 53 to generate motive power is stopped. After detection of the fourth state, it is determined whether the second state is again detected within a second predetermined period of time. When it is determined that the second state is again detected, the control that causes the electric motor 53 to generate motive power may be resumed.

Even if the rider intends to continue an operation that manipulates the first and second electrical contacts 181 and 182, depending on how the rider's operation is actually performed, vibration of the electrically assisted bicycle 1, etc., at least one of the first and second electrical contacts 181 and 182 may temporarily come into an OFF state. Even without again determining whether the first state is detected or not, the control that causes the electric motor 53 to generate motive power may be resumed, thus providing an improved ease of use of the electrically assisted bicycle 1.

According to a preferred embodiment of the present invention, after determining that the fourth state is detected, when it is determined that the second state is not detected again within the second predetermined period of time, the microcontroller 71 may again determine whether the first state is detected or not.

When the rider's operation is improper, or a fault occurs such that at least one of the first and second electrical contacts 181 and 182 can never take an ON state, the second state will not be detected again within the second predetermined period of time. In such a case, the control returns to the process of determining whether the first state is detected or not. If the rider's operation was improper, the rider may now retry a proper operation, thus allowing the electric motor 53 to generate motive power. If a fault exists such that at least one of the first and second electrical contacts 181 and 182 can never take an ON state, the electric motor 53 is not allowed to generate motive power. This improves the reliability of controlling the electric motor 53.

According to a preferred embodiment of the present invention, after determining that the first state is detected, the microcontroller 71 determines whether a fifth state, in which the second signal 202 indicates ON within a third predetermined period of time since the first signal 201 indicates ON, is detected or not. When it is determined that the fifth state is detected, the microcontroller 71 may not perform a control that causes the electric motor 53 to generate motive power.

In an implementation in which a difference between points in time at which the first electrical contact 181 and the second electrical contact 182 become ON exists during normal operation, if the first electrical contact 181 and the second electrical contact 182 are short-circuited to each other, the first signal 201 and the second signal 202 may simultaneously indicate ON in response to the rider's operation.

If the second signal 202 indicates ON within the third predetermined period of time since the first signal 201 indicates ON, it is possible that the first electrical contact 181 and the second electrical contact 182 may be short-circuited to each other, and therefore the electric motor 53 is not allowed to generate motive power. This improves the reliability of controlling the electric motor 53.

According to a preferred embodiment of the present invention, after determining that the first state is detected, the microcontroller 71 determines whether a fifth state, in which the second signal 202 indicates ON within a third predetermined period of time since the first signal 201 indicates ON, is detected or not. When it is determined that the fifth state is detected, the microcontroller 71 may again determine whether the first state is detected or not.

In an implementation in which a difference between points in time at which the first electrical contact 181 and the second electrical contact 182 become ON exists during normal operation, if the first electrical contact 181 and the second electrical contact 182 are short-circuited to each other, the first signal 201 and the second signal 202 may simultaneously indicate ON in response to the rider's operation.

If the second signal 202 indicates ON within the third predetermined period of time since the first signal 201 indicates ON, it is possible that the first electrical contact 181 and the second electrical contact 182 may be short-circuited to each other, and therefore the electric motor 53 is not allowed to generate motive power. Recognizing that motive power is not generated, the rider may try an operation that manipulates the first and second electrical contacts 181 and 182 again. As the operation is tried again, the first state will be again detected. If short-circuiting exists, after the redetection of the first state, the fifth state will be again detected; therefore, a control that causes the electric motor 53 to generate motive power is not performed. This improves the reliability of controlling the electric motor 53.

According to a preferred embodiment of the present invention, when it is determined that the fifth state is not detected, and yet the second state is detected, the microcontroller 71 may perform a control that causes the electric motor 53 to generate motive power. If the first electrical contact 181 and the second electrical contact 182 are not short-circuited to each other, the normal control of allowing the electric motor 53 to generate motive power is performed.

According to a preferred embodiment of the present invention, the microcontroller 71 may determine whether the sixth state, in which the first state is continuously undetected, lasts for the fourth predetermined period of time or not, and when it is determined that the sixth state has lasted for the fourth predetermined period of time, determine that at least one of the first electrical contact 181 and the second electrical contact 182 is faulty.

If a fault occurs such that at least one of the first and second electrical contacts 181 and 182 remains perpetually in an ON state, the first state will not be detected. If the sixth state, in which the first state is continuously undetected, lasts for the fourth predetermined period of time, it is determined that a fault exists. This improves the reliability of controlling the electric motor 53.

According to a preferred embodiment of the present invention, the drive system 51 may include, as the walk-along switch 82, a double-pole double-throw switch that includes the first electrical contact 181 and the second electrical contact 182. The rider is able to manipulate the first electrical contact 181 and the second electrical contact 182 by pressing the double-pole double-throw switch.

According to a preferred embodiment of the present invention, the drive system 51 may include, as the walk-along switch 82, a first switch that includes the first electrical contact 181 and a second switch that includes the second electrical contact 182. The rider is able to manipulate the first electrical contact 181 and the second electrical contact 182 by pressing the first switch and the second switch.

An electrically assisted bicycle 1 according to preferred embodiments of the present invention includes the above-described drive system 51. As a result, an electrically assisted bicycle 1 with improved reliability of controlling the electric motor 53 is provided.

According to a preferred embodiment of the present invention, when it is determined that the second state is detected after detection of the first state, the microcontroller 71 may perform a control to cause the electrically assisted bicycle 1 to enter a walk-along mode that allows the electric motor 53 to generate an assistance force while the rider walks along with the electrically assisted bicycle 1. As a result, an electrically assisted bicycle 1 with improved reliability of controlling the walk-along mode is provided.

Thus, preferred embodiments of the present invention have been described. The foregoing description of preferred embodiments are mere illustrations of the present invention, and should not be interpreted as limiting the present invention. Other preferred embodiments can also emerge from certain combinations of the component elements described in the above preferred embodiments. Various changes, substitutions, additions, omissions, etc., can be made to the present invention without departing from the scope defined by the claims and the equivalents thereof.

Preferred embodiments of the present invention are especially useful in the fields of vehicles that allow a motive power source to generate motive power in accordance with a rider's operation.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A drive system for use in a vehicle, the drive system comprising:
    a motive power source to generate motive power to cause the vehicle to move;
    a first electrical contact and a second electrical contact each of which switches between an ON state and an OFF state in response to a rider's operation; and
    a control circuit to receive a first signal regarding a state of the first electrical contact and a second signal regarding a state of the second electrical contact, and to control an operation of the motive power source based on the first signal and the second signal; wherein
    the control circuit is configured or programmed to:
        determine whether a first state, in which the first signal and the second signal both indicate OFF, is detected or not;
        after determining that the first state is detected, determine whether a second state, in which the first signal and the second signal both indicate ON, is detected or not;
        when the second state is detected after detection of the first state, perform a control that causes the motive power source to generate motive power; and
        when the first state is not detected and the second state is detected, not perform the control that causes the motive power source to generate motive power.

2. The drive system of claim 1, wherein the control circuit is configured or programmed to:
    after the first state is detected, determine whether a third state, in which one of the first signal and the second signal indicates ON but the other indicates OFF, lasts for a first predetermined period of time;
    when the third state has lasted for the first predetermined period of time, again determine whether the first state is detected or not;
    after determining again that the first state is detected, again determine whether the third state lasts for the first predetermined period of time or not;
    determine whether the third state lasting for the first predetermined period of time has occurred a first predetermined number of times or more; and
    when the third state lasting for the first predetermined period of time has occurred the first predetermined number of times or more, not perform the control that causes the motive power source to generate motive power.

3. The drive system of claim 2, wherein the control circuit is configured or programmed to:
    when the second state is detected before the first predetermined period of time elapses since detection of the third state, perform the control that causes the motive power source to generate motive power.

4. The drive system of claim 2, wherein the control circuit is configured or programmed to:
    when the second state is detected before the third state lasting for the first predetermined period of time occurs the first predetermined number of times, perform the control that causes the motive power source to generate motive power.

5. The drive system of claim 1, wherein the control circuit is configured or programmed to:

after determining that the first state and the second state are detected, determine whether a third state, in which at least one of the first signal and the second signal indicates OFF, is detected or not;

when the third state is detected, stop the control that causes the motive power source to generate motive power;

after determining that the third state is detected, determine whether the second state is again detected within a second predetermined period of time; and when the second state is again detected, resume the control that causes the motive power source to generate motive power.

6. The drive system of claim 5, wherein the control circuit is configured or programmed to:

after determining that the third state is detected, when the second state is not detected again within the second predetermined period of time, again determine whether the first state is detected or not.

7. The drive system of claim 1, wherein, after determining that the first state is detected, the control circuit is configured or programmed to:

determine a fifth state, in which the second signal indicates ON within a third predetermined period of time since the first signal indicates ON, is detected or not; and when the fifth state is detected, not perform the control that causes the motive power source to generate motive power.

8. The drive system of claim 1, wherein, after determining that the first state is detected, the control circuit is configured or programmed to:

determine a fifth state, in which the second signal indicates ON within a third predetermined period of time since the first signal indicates ON, is detected or not; and, when the fifth state is detected, again determine whether the first state is detected or not.

9. The drive system of claim 7, wherein the control circuit is configured or programmed to:

when the fifth state is not detected, and yet the second state is detected, perform the control that causes the motive power source to generate motive power.

10. The drive system of claim 1, wherein the control circuit is configured or programmed to:

determine whether a sixth state, in which the first state is continuously undetected, lasts for a fourth predetermined period of time; and when the sixth state has lasted for the fourth predetermined period of time, determine that at least one of the first electrical contact and the second electrical contact is faulty.

11. The drive system of claim 1, wherein the motive power source is an electric motor.

12. The drive system of claim 1, further comprising a double-pole double-throw switch that includes the first electrical contact and the second electrical contact.

13. The drive system of claim 1, further comprising a first switch that includes the first electrical contact and a second switch that includes the second electrical contact.

14. A vehicle comprising the drive system of claim 1.

15. The vehicle of claim 14, wherein the control circuit is configured or programmed to:

when the second state is detected after detection of the first state, perform a control that causes the vehicle to enter a walk-along mode that allows the motive power source to generate an assistance force while the rider walks along with the vehicle.

16. A method of controlling a drive system for a vehicle, the method comprising:

providing a first electrical contact and a second electrical contact each of which switches between an ON state and an OFF state in response to a rider's operation;

receiving a first signal regarding a state of the first electrical contact and a second signal regarding a state of the second electrical contact; and controlling an operation of a motive power source that generates a motive power to cause the vehicle to move based on the first signal and the second signal; wherein the step of controlling the operation of the motive power source includes:

determining whether a first state, in which the first signal and the second signal both indicate OFF, is detected or not;

after determining that the first state is detected, determining whether a second state, in which the first signal and the second signal both indicate ON, is detected or not;

when the second state is detected after detection of the first state, causing the motive power source to generate motive power; and when the first state is not detected and the second state is detected, not causing the motive power source to generate motive power.

* * * * *